US012738549B2

(12) United States Patent
Hiasa

(10) Patent No.: US 12,738,549 B2

(45) Date of Patent: Sep. 15, 2026

(54) SECONDARY BATTERY, SECONDARY BATTERY CONTROL SYSTEM, AND BATTERY PACK

(71) Applicant: MURATA MANUFACTURING CO., LTD., Kyoto (JP)

(72) Inventor: Takumi Hiasa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 709 days.

(21) Appl. No.: 18/128,027

(22) Filed: Mar. 29, 2023

(65) Prior Publication Data

US 2023/0238593 A1 Jul. 27, 2023

Related U.S. Application Data

(63) Continuation of application No. PCT/JP2021/042659, filed on Nov. 19, 2021.

(30) Foreign Application Priority Data

Nov. 20, 2020 (JP) ................................ 2020-193480

(51) Int. Cl.

*H01M 14/00* (2006.01)
*H01M 10/26* (2006.01)
(Continued)

(52) U.S. Cl.

CPC ........... *H01M 10/44* (2013.01); *H01M 10/26* (2013.01); *H01M 10/28* (2013.01); *H01M 2300/0014* (2013.01)

(58) Field of Classification Search

CPC .. H01M 10/44; H01M 10/445; H01M 10/446; H01M 10/26; H01M 10/24; H01M 10/28; H01M 10/287; H01M 2300/0014

See application file for complete search history.

(56) References Cited

U.S. PATENT DOCUMENTS

2007/0117007 A1* 5/2007 Visco ................ H01M 10/0562 429/405
2011/0187330 A1 8/2011 Shimizu et al.
(Continued)

FOREIGN PATENT DOCUMENTS

JP H05242912 9/1993
JP H08138746 5/1996
(Continued)

OTHER PUBLICATIONS

International Search Report of corresponding PCT application PCT/JP2021/042659, dated Feb. 1, 2022.

*Primary Examiner* — Raymond Alejandro
(74) *Attorney, Agent, or Firm* — K&L Gates LLP

(57) ABSTRACT

A secondary battery includes a partition, a positive electrode, a negative electrode, a positive electrode electrolytic solution, a negative electrode electrolytic solution, and a negative electrode capacity restoring electrode, a positive electrode capacity restoring electrode, or both. The partition is disposed between a positive electrode space and a negative electrode space, and allows an alkali metal ion to pass therethrough. The positive electrode is disposed in the positive electrode space and is an electrode which the alkali metal ion is to be inserted into and extracted from. The negative electrode is disposed in the negative electrode space and is an electrode which the alkali metal ion is to be inserted into and extracted from. The positive electrode electrolytic solution is contained in the positive electrode space and includes an aqueous solvent and the alkali metal ion. The negative electrode electrolytic solution is contained in the negative electrode space and includes an aqueous solvent and the alkali metal ion. The negative electrode capacity restoring electrode is disposed in the positive electrode space. The positive electrode capacity restoring electrode is disposed in the negative electrode space. The negative electrode capacity restoring electrode includes a hydrogen-generating material, an oxygen-reducing material, or both. The positive electrode capacity restoring electrode includes an oxygen-generating material, a hydrogen-oxidizing material, or both.

7 Claims, 4 Drawing Sheets

(51) Int. Cl.
*H01M 10/28* (2006.01)
*H01M 10/44* (2006.01)

(56) References Cited

U.S. PATENT DOCUMENTS

| | | | | |
|---|---|---|---|---|
| 2011/0206961 | A1* | 8/2011 | Balachov ................ | H01M 8/22 29/623.2 |
| 2012/0183868 | A1* | 7/2012 | Toussaint ................ | H01M 6/24 204/251 |
| 2015/0140453 | A1* | 5/2015 | Stevens ................. | H01M 12/02 429/405 |
| 2017/0244135 | A1 | 8/2017 | Momo | |

FOREIGN PATENT DOCUMENTS

| | | | |
|---|---|---|---|
| JP | 2002324585 | A | 11/2002 |
| JP | 2007172985 | | 7/2007 |
| JP | 2011165343 | A | 8/2011 |
| JP | 2014110184 | A | 6/2014 |
| JP | 2017152377 | A | 8/2017 |
| JP | 2018163893 | A | 10/2018 |
| JP | 2020057564 | A | 4/2020 |
| WO | 2008041714 | A1 | 4/2008 |

* cited by examiner 21
24
25
23
26
1
22

53 +
54 −
TEMPERATURE DETECTION TERMINAL
55
TEMPERATURE DETECTOR
59
CON-TROLLER
56
SWITCH
57
PTC DEVICE
58
ELECTRIC POWER SOURCE
51
52

SECONDARY BATTERY, SECONDARY BATTERY CONTROL SYSTEM, AND BATTERY PACK

CROSS REFERENCE TO RELATED APPLICATIONS

The present application is a continuation of PCT patent application no. PCT/JP2021/042659, filed on Nov. 19, 2021, which claims priority to Japanese patent application no. JP2020-193480, filed on Nov. 20, 2020, the entire contents of which are incorporated herein by reference.

BACKGROUND

The present application relates to a secondary battery, a secondary battery control system, and a battery pack.

Various kinds of electronic equipment, including mobile phones, have been widely used. Such widespread use has promoted development of a secondary battery as a power source that is smaller in size and lighter in weight and allows for a higher energy density. As such a secondary battery, a secondary battery including an electrolytic solution that includes an aqueous solvent, i.e., a so-called aqueous electrolytic solution, is being developed. A configuration of, for example, the secondary battery including the aqueous electrolytic solution has been considered in various ways.

Specifically, in order to suppress a decrease in capacity of a secondary battery including a non-aqueous electrolytic solution, a polymer forming agent or a sacrificial reducing agent is added to the nonaqueous electrolytic solution, and a voltage is applied to between a battery container and an anode. In order to enhance an over-discharge characteristic of a secondary battery, a lithium salt solution is added to an electrolytic solution, and, along with electrolysis, lithium is inserted into a negative electrode and decomposition gas is generated from a positive electrode.

In order to enhance charge and discharge efficiency of a rocking-chair type secondary battery including an alkaline aqueous solution electrolytic solution, an appropriate range of a pH of the aqueous solution electrolytic solution, which is from 4 to 12, is defined. In order to shorten working hours of a refresh operation of a secondary battery, a value of a current during the refresh operation is gradually decreased, following which the secondary battery is discharged until a value of electric capacity is equal to a predetermined final discharge capacity value.

SUMMARY

The present application relates to a secondary battery, a secondary battery control system, and a battery pack.

Although consideration has been given in various ways regarding a configuration of, for example, a secondary battery including an aqueous electrolytic solution, a technique of restoring a battery capacity of the secondary battery including the aqueous electrolytic solution is not sufficient yet.

It is therefore desirable to provide a secondary battery, a secondary battery control system, and a battery pack that make it possible to restore a battery capacity.

A secondary battery according to an embodiment includes a partition, a positive electrode, a negative electrode, a positive electrode electrolytic solution, a negative electrode electrolytic solution, and a negative electrode capacity restoring electrode, a positive electrode capacity restoring electrode, or both. The partition is disposed between a positive electrode space and a negative electrode space, and allows an alkali metal ion to pass therethrough. The positive electrode is disposed in the positive electrode space and is an electrode which the alkali metal ion is to be inserted into and extracted from. The negative electrode is disposed in the negative electrode space and is an electrode which the alkali metal ion is to be inserted into and extracted from. The positive electrode electrolytic solution is contained in the positive electrode space and includes an aqueous solvent and the alkali metal ion. The negative electrode electrolytic solution is contained in the negative electrode space and includes an aqueous solvent and the alkali metal ion. The negative electrode capacity restoring electrode is disposed in the positive electrode space. The positive electrode capacity restoring electrode is disposed in the negative electrode space. The negative electrode capacity restoring electrode includes a hydrogen-generating material, an oxygen-reducing material, or both. The positive electrode capacity restoring electrode includes an oxygen-generating material, a hydrogen-oxidizing material, or both.

A secondary battery control system according to an embodiment of the present technology includes a control circuit to be coupled to a secondary battery. The control circuit performs a process including switching a coupling destination of a positive electrode from a negative electrode to a positive electrode capacity restoring electrode and causing the positive electrode and the positive electrode capacity restoring electrode to energize each other, a process including switching a coupling destination of the negative electrode from the positive electrode to a negative electrode capacity restoring electrode and causing the negative electrode and the negative electrode capacity restoring electrode to energize each other, or both the processes. Such a secondary battery has a configuration similar to the configuration of the secondary battery according to an embodiment of the present technology described above.

A battery pack according to an embodiment of the present technology includes a secondary battery and a secondary battery control system. Such a secondary battery has a configuration similar to the configuration of the secondary battery according to an embodiment of the present technology described herein, and such a secondary battery control system has a configuration similar to the configuration of the secondary battery control system according to an embodiment of the present technology described herein.

The secondary battery according to an embodiment of the present technology includes the positive electrode, the negative electrode, the positive electrode electrolytic solution including the aqueous solvent, and the negative electrode electrolytic solution including the aqueous solvent, and also includes the negative electrode capacity restoring electrode, the positive electrode capacity restoring electrode, or both. The negative electrode capacity restoring electrode includes the hydrogen-generating material, the oxygen-reducing material, or both, and the positive electrode capacity restoring electrode includes the oxygen-generating material, the hydrogen-oxidizing material, or both. Accordingly, it is possible to restore a battery capacity.

The secondary battery control system according to an embodiment of the present technology includes the control circuit that performs the process of causing the positive electrode and the positive electrode capacity restoring electrode to energize each other, the process of causing the negative electrode and the negative electrode capacity restoring electrode to energize each other, or both the processes. Accordingly, it is possible to restore a battery capacity of the secondary battery.

The battery pack according to an embodiment of the present technology includes the secondary battery and the secondary control system described above. Accordingly, it is possible to restore the battery capacity of the secondary battery.

Note that effects of the present technology are not necessarily limited to those described herein and may include any of a series of suitable effects in relation to the present technology.

BRIEF DESCRIPTION OF THE FIGURES

FIG. 1 is a sectional view of a configuration of a secondary battery according to an embodiment of the present technology.

DETAILED DESCRIPTION

Figure 2:
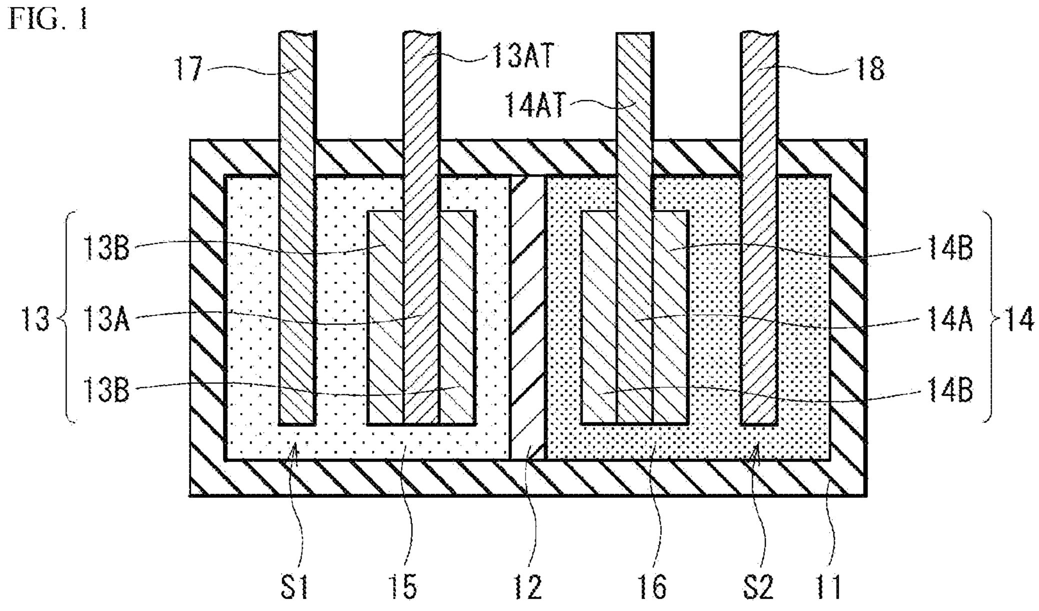
FIG. 2 is a block diagram illustrating a configuration of a secondary battery control system according to an embodiment of the present technology.

One or more embodiments of the present technology are described below in further detail including with reference to the drawings.

A description is given of a secondary battery according to an embodiment of the present technology.

A secondary battery to be described here is a secondary battery utilizing insertion and extraction of an alkali metal ion. The secondary battery includes a positive electrode, a negative electrode, and an electrolytic solution that is a liquid electrolyte including an aqueous solvent, i.e., an aqueous electrolytic solution. The secondary battery utilizes insertion and extraction of the alkali metal ion to allow charging and discharging reactions to proceed, thereby obtaining a battery capacity.

The alkali metal ion is not limited to a particular kind. Specific examples of the alkali metal ion include a lithium ion, a sodium ion, and a potassium ion. A reason for this is that the charging and discharging reactions proceed stably while a high voltage is obtained.

FIG. 1 illustrates a sectional configuration of the secondary battery. As illustrated in FIG. 1, the secondary battery includes an outer package member 11, a partition 12, a positive electrode 13, a negative electrode 14, a positive electrode electrolytic solution 15, a negative electrode electrolytic solution 16, a negative electrode capacity restoring electrode 17, and a positive electrode capacity restoring electrode 18. In FIG. 1, the positive electrode electrolytic solution 15 is lightly shaded and the negative electrode electrolytic solution 16 is darkly shaded.

The positive electrode electrolytic solution 15 and the negative electrode electrolytic solution 16 are each the aqueous electrolytic solution including the aqueous solvent described above. The aqueous electrolytic solution is a solution in which an ionizable ionic material is dissolved or dispersed in the aqueous solvent, as will be described later.

In the following description, for convenience, an upper side in FIG. 1 represents an upper side of the secondary battery and a lower side in FIG. 1 represents a lower side of the secondary battery.

The outer package member 11 is a generally box-shaped member having an internal space for containing components including, without limitation, the partition 12, the positive electrode 13, the negative electrode 14, the positive electrode electrolytic solution 15, the negative electrode electrolytic solution 16, the negative electrode capacity restoring electrode 17, and the positive electrode capacity restoring electrode 18.

The outer package member 11 includes one or more of materials including, without limitation, a metal material, a glass material, and a polymer compound. Specifically, the outer package member 11 may be, but not limited to, a rigid metal can, a rigid glass case, a rigid plastic case, a soft or flexible metal foil, or a soft or flexible polymer film.

The partition 12 is disposed inside the outer package member 11, and divides the internal space of the outer package member 11 into two spaces, i.e., a positive electrode compartment S1 serving as a positive electrode space and a negative electrode compartment S2 serving as a negative electrode space. In other words, the partition 12 is disposed between the positive electrode compartment S1 and the negative electrode compartment S2, and thus separates the positive electrode compartment S1 and the negative electrode compartment S2 from each other. Accordingly, the positive electrode 13 and the negative electrode 14 are opposed to each other with the partition 12 interposed therebetween, and are separated from each other with the partition 12 interposed therebetween.

The partition 12 does not allow an anion to pass therethrough and allows a substance such as the alkali metal ion (a cation) other than the anion, which is to be inserted into and extracted from each of the positive electrode 13 and the negative electrode 14, to pass therethrough, between the positive electrode compartment S1 and the negative electrode compartment S2. In other words, the partition 12 allows the substance such as the alkali metal ion to pass therethrough while preventing mixing of the positive electrode electrolytic solution 15 and the negative electrode electrolytic solution 16 with each other. In this case, the partition 12 allows the alkali metal ion to pass therethrough from the positive electrode compartment S1 to the negative electrode compartment S2, and allows the alkali metal ion to pass therethrough from the negative electrode compartment S2 to the positive electrode compartment S1.

Specifically, the partition 12 includes one or more of materials including, without limitation, a porous film and a solid electrolyte. The porous film is, for example, a positive ion exchange membrane that allows a cation to pass therethrough. The solid electrolyte has an alkali metal ion-conductive property.

The positive electrode 13 is disposed in the positive electrode compartment S1, and is an electrode that allows the alkali metal ion to be inserted thereinto and extracted therefrom. Here, the positive electrode 13 includes a positive electrode current collector 13A having two opposed surfaces, and a positive electrode active material layer 13B provided on each of the two opposed surfaces of the positive electrode current collector 13A. However, the positive electrode active material layer 13B may be provided only on one of the two opposed surfaces of the positive electrode current collector 13A.

Note that the positive electrode current collector 13A is omittable. Therefore, the positive electrode 13 may include only the positive electrode active material layer 13B.

The positive electrode current collector 13A supports the positive electrode active material layer 13B, and includes one or more of electrically conductive materials including, without limitation, a metal material, a carbon material, and an electrically conductive ceramic material. Specific examples of the metal material include titanium, aluminum, and an alloy thereof. Specific examples of the electrically conductive ceramic material include indium tin oxide (ITO).

Here, the positive electrode active material layer 13B is not provided on a portion of the positive electrode current collector 13A, i.e., a coupling terminal part 13AT, and the coupling terminal part 13AT is led out of the outer package member 11.

In particular, the positive electrode current collector 13A preferably includes a material that is insoluble or sparingly soluble in and resistant to corrosion by the positive electrode electrolytic solution 15, and that has low reactivity to a positive electrode active material to be described later. Specifically, the positive electrode current collector 13A preferably includes any of the above-described metal materials. That is, the positive electrode current collector 13A preferably includes a material such as titanium, aluminum, or an alloy thereof. A reason for this is that degradation of the positive electrode current collector 13A is thereby suppressed even if the secondary battery is charged and discharged.

The positive electrode current collector 13A may be an electric conductor having a surface covered with plating of one or more of the metal material, the carbon material, or the electrically conductive ceramic material described above. The electric conductor is not limited to a particular material as long as the material is electrically conductive.

The positive electrode active material layer 13B includes one or more of positive electrode active materials which the alkali metal ion is to be inserted into and extracted from. Note that the positive electrode active material layer 13B may further include one or more of other materials including, without limitation, a positive electrode binder and a positive electrode conductor.

The positive electrode active material which a lithium ion is to be inserted into and extracted from as the alkali metal ion includes, for example, a lithium-containing compound. The lithium-containing compound is not limited to a particular kind, and specific examples thereof include a lithium composite oxide and a lithium phosphoric acid compound. The lithium composite oxide is an oxide that includes lithium and one or more transition metal elements as constituent elements. The lithium phosphoric acid compound is a phosphoric acid compound that includes lithium and one or more transition metal elements as constituent elements. The transition metal elements are not limited to particular kinds, and specific examples thereof include nickel, cobalt, manganese, and iron.

Specific examples of the lithium composite oxide having a layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Specific examples of the lithium composite oxide having a spinel crystal structure include $LiMn_2O_4$. Specific examples of the lithium phosphoric acid compound having an olivine crystal structure include $LiFePO_4$, $LiMnPO_4$, $LiMn_{0.5}Fe_{0.5}PO_4$, $LiMn_{0.7}Fe_{0.3}PO_4$, and $LiMn_{0.75}Fe_{0.25}PO_4$.

The positive electrode active material which a sodium ion is to be inserted into and extracted from as the alkali metal ion includes, for example, a sodium-containing compound. The sodium-containing compound is not limited to a particular kind, and specific examples thereof include a Prussian blue analog represented by Formula (1).

$$Na_xK_yM1_zFe(CN)_6 \cdot aH_2O \qquad (1)$$

where:

M1 is Mn, Zn, or both;

x, y, and z satisfy $0.5<x\leq 2$, $0\leq y\leq 0.5$, and $0\leq z\leq 2$;

a is any value; and y may satisfy $0.05\leq y\leq 0.2$.

Specific examples of the Prussian blue analog include $Na_2MnFe(CN_6)$, $Na_{1.42}K_{0.09}Mn_{1.13}Fe(CN)_6 \cdot 3H_2O$, and $Na_{0.83}K_{0.12}Zn_{1.49}Fe(CN)_6 \cdot 3.2H_2O$.

The positive electrode active material which a potassium ion is to be inserted into and extracted from as the alkali metal ion includes, for example, a potassium-containing compound. Specific examples of the potassium-containing compound include $K_{0.7}Fe_{0.6}Mn_{0.6}O_2$, $K_{0.6}MnO_2$, $K_{0.3}MnO_2$, $K_{0.31}CoO_2$, $KCrO_2$, $K_{0.6}CoO_2$, $K_{2/3}Mn_{2/3}Co_{1/3}Ni_{1/3}O_2$, $K_{2/3}Ni_{2/3}Te_{1/3}O_2$, $K_{2/3}Ni_{1/6}Co_{1/2}Te_{1/3}O_2$, $K_{2/3}Ni_{1/2}Mn_{1/6}Te_{1/3}O_2$, $K_{2/3}Ni_{1/2}Co_{1/6}Te_{1/3}O_2$, $K_{2/3}Ni_{1/3}Zn_{1/3}Te_{1/3}O_2$, $K_{2/3}Ni_{1/6}Mg_{1/2}Te_{1/3}O_2$, $K_{2/3}Ni_{1/2}Co_{1/6}Te_{1/3}O_2$, $K_{2/3}Ni_{1/3}Mg_{1/3}Te_{1/3}O_2$, and $K_{2/3}Ni_{1/3}Co_{1/3}Te_{1/3}O_2$.

In particular, the positive electrode 13 preferably includes the positive electrode active material which the alkali metal ion is to be inserted into and extracted from at a potential, versus a standard hydrogen reference electrode, of higher than or equal to 0.4 V. Specific examples of the positive electrode active material include $LiNiO_2$, $LiCoO_2$, $LiMn_2O_4$, $LiNi_{0.80}Co_{0.15}Al_{0.05}O_2$, and $LiNi_{0.33}Co_{0.33}Mn_{0.33}O_2$. A reason for this is that, in a capacity restoring process of the secondary battery to be described later, a potential range is increased in which a capacity restoring reaction spontaneously proceeds between the positive electrode 13 and the positive electrode capacity restoring electrode 18 even if almost no potential is applied by an unillustrated external electric power source. This makes it easier for the capacity restoring reaction of the secondary battery to proceed with extremely small power consumption, and also makes it easier for the battery capacity to be restored in the capacity restoring process.

The positive electrode binder includes one or more of materials including, without limitation, a synthetic rubber and a polymer compound. Specific examples of the synthetic rubber include a styrene-butadiene-based rubber. Specific examples of the polymer compound include polyvinylidene difluoride and polyimide.

The positive electrode conductor includes one or more of electrically conductive materials including, without limitation, a carbon material. Specific examples of the carbon material include graphite, carbon black, acetylene black, and Ketjen black. Note that the electrically conductive material may be a material such as a metal material, an electrically conductive ceramic material, or an electrically conductive polymer.

The negative electrode 14 is disposed in the negative electrode compartment S2, and is an electrode allows the alkali metal ion to be inserted thereinto and extracted therefrom. Here, the negative electrode 14 includes a negative electrode current collector 14A having two opposed surfaces, and a negative electrode active material layer 14B provided on each of the two opposed surfaces of the negative electrode current collector 14A. However, the negative electrode active material layer 14B may be provided only on one of the two opposed surfaces of the negative electrode current collector 14A.

Note that the negative electrode current collector 14A is omittable. Therefore, the negative electrode 14 may include only the negative electrode active material layer 14B.

The negative electrode current collector 14A supports the negative electrode active material layer 14B, and includes one or more of electrically conductive materials including, without limitation, a metal material, a carbon material, and an electrically conductive ceramic material. Specific examples of the metal material include stainless steel (SUS), titanium, zinc, tin, lead, and an alloy thereof. The stainless steel may be highly corrosion-resistant stainless steel to which one or more of additive elements including, without limitation, niobium and molybdenum are added. Specifically, the stainless steel may be SUS444 to which molybdenum is added as an additive element. Details of the electrically conductive ceramic material are as described above.

Here, the negative electrode active material layer 14B is not provided on a portion of the negative electrode current collector 14A, i.e., a coupling terminal part 14AT, and the coupling terminal part 14AT is led out of the outer package member 11. A direction in which the coupling terminal part 14AT is led out is not particularly limited, and is specifically similar to a direction in which the coupling terminal part 13AT is led out.

In particular, the negative electrode current collector 14A preferably includes a material that is insoluble or sparingly soluble in and resistant to corrosion by the negative electrode electrolytic solution 16, and that has low reactivity to a negative electrode active material to be described later. Specifically, the negative electrode current collector 14A preferably includes any of the above-described metal materials. That is, the negative electrode current collector 14A preferably includes a material such as stainless steel, titanium, zinc, tin, lead, or an alloy thereof. A reason for this is that degradation of the negative electrode current collector 14A is thereby suppressed even if the secondary battery is charged and discharged.

The negative electrode current collector 14A may be an electric conductor having a surface covered with plating of one or more of the metal material, the carbon material, or the electrically conductive ceramic material described above. The electric conductor is not limited to a particular material as long as the material is electrically conductive.

The negative electrode active material layer 14B includes one or more of negative electrode active materials which the alkali metal ion is to be inserted into and extracted from. Note that the negative electrode active material layer 14B may further include one or more of other materials including, without limitation, a negative electrode binder and a negative electrode conductor. Details of the negative electrode binder are similar to those of the positive electrode binder. Details of the negative electrode conductor are similar to those of the positive electrode conductor.

The negative electrode active material includes a titanium-containing compound, a niobium-containing compound, a vanadium-containing compound, an iron-containing compound, and a molybdenum-containing compound. A reason for this is that this allows the charging and discharging reactions to proceed smoothly and stably even in a case of using the positive electrode electrolytic solution 15 and the negative electrode electrolytic solution 16.

Examples of the titanium-containing compound include a titanium oxide, an alkali-metal-titanium composite oxide, a titanium phosphoric acid compound, an alkali metal titanium phosphoric acid compound, and a hydrogen titanium compound.

The titanium oxide includes a compound represented by Formula (2), i.e., titanium oxide of a bronze type, for example.

$$TiO_w \quad (2)$$

where w satisfies $1.85 \le w \le 2.15$.

The titanium oxide above includes one or more of titanium oxide ($TiO_2$) of an anatase type, titanium oxide ($TiO_2$) of a rutile type, or titanium oxide ($TiO_2$) of a brookite type. However, the titanium oxide may be a composite oxide including one or more of elements including, without limitation, phosphorus, vanadium, tin, copper, nickel, iron, and cobalt as one or more constituent elements together with titanium. Specific examples of such a composite oxide include $TiO_2—P_2O_5$, $TiO_2—V_2O_5$, $TiO_2—P_2O_5—SnO_2$, and $TiO_2—P_2O_5$-MeO, where Me is one or more of elements including, without limitation, Cu, Ni, Fe, and Co.

One kind of the alkali-metal-titanium composite oxide is a lithium-titanium composite oxide, examples of which include respective compounds represented by Formulae (3) to (5), i.e., lithium titanate of a ramsdellite type. M3 in Formula (3) is a metal element that is to be a divalent ion. M4 in Formula (4) is a metal element that is to be a trivalent ion. M5 in Formula (5) is a metal element that is to be a tetravalent ion.

$$Li[Li_xM3_{(1-3x)/2}Ti_{(3+x)/2}]O_4 \quad (3)$$

where:

M3 is at least one of Mg, Ca, Cu, Zn, or Sr; and x satisfies $0 \le x \le 1/3$.

$$Li[Li_yM4_{1-3y}Ti_{1+2y}]O_4 \quad (4)$$

where:

M4 is at least one of Al, Sc, Cr, Mn, Fe, Ge, or Y; and y satisfies $0 \le y \le 1/3$.

$$Li[Li_{1/3}M5_zTi_{(5/3)-z}]O_4 \quad (5)$$

where:

M5 is at least one of V, Zr, or Nb; and z satisfies $0 \le z \le 2/3$.

Specific examples of the lithium-titanium composite oxide represented by Formula (3) include $Li_{3.75}Ti_{4.875}Mg_{0.375}O_{12}$. Specific examples of the lithium-titanium composite oxide represented by Formula (4) include $LiCrTiO_4$. Specific examples of the lithium-titanium composite oxide represented by Formula (5) include $Li_4Ti_5O_{12}$ and $Li_4Ti_{4.95}Nb_{0.05}O_{12}$.

Another kind of the alkali-metal-titanium composite oxide is a potassium-titanium composite oxide, specific examples of which include $K_2Ti_3O_7$ and $K_4Ti_5O_{12}$.

Specific examples of the titanium phosphoric acid compound include titanium phosphate ($TiP_2O_7$). One kind of the alkali metal titanium phosphoric acid compound is a lithium titanium phosphoric acid compound, specific examples of which include $LiTi_2(PO_4)_3$. Another kind of the alkali metal titanium phosphoric acid compound is a sodium titanium phosphoric acid compound, specific examples of which include $NaTi_2(PO_4)_3$. Specific examples of the hydrogen titanium compound include $H_2Ti_3O_7(3TiO_2{\cdot}1H_2O)$, $H_6Ti_{12}O_{27}(3TiO_2{\cdot}0.75H_2O)$, $H_2Ti_6O_{13}(3TiO_2{\cdot}0.5H_2O)$, $H_2Ti_7O_{15}(3TiO_2{\cdot}0.43H_2O)$, and $H_2Ti_{12}O_{25}(3TiO_2{\cdot}0.25H_2O)$.

Examples of the niobium-containing compound include an alkali-metal-niobium composite oxide, a hydrogen niobium compound, and a titanium-niobium composite oxide. Note that a material belonging to the niobium-containing compound is excluded from the titanium-containing compound.

Specific examples of the alkali-metal-niobium composite oxide include $LiNbO_2$. Specific examples of the hydrogen niobium compound include $H_4Nb_6O_{17}$. Specific examples of the titanium-niobium composite oxide include $TiNb_2O_7$ and $Ti_2Nb_{10}O_{29}$. The titanium-niobium composite oxide may be intercalated with the alkali metal.

Examples of the vanadium-containing compound include a vanadium oxide and an alkali-metal-vanadium composite oxide. Note that a material belonging to the vanadium-containing compound is excluded from each of the titanium-containing compound and the niobium-containing compound.

Specific examples of the vanadium oxide include vanadium dioxide ($VO_2$). Specific examples of the alkali-metal-vanadium composite oxide include $LiV_2O_4$ and $LiV_3O_8$.

Examples of the iron-containing compound include iron hydroxide. Note that a material belonging to the iron-containing compound is excluded from each of the titanium-containing compound, the niobium-containing compound, and the vanadium-containing compound.

Specific examples of the iron hydroxide include iron oxyhydroxide (FeOOH). The iron oxyhydroxide may be α-iron oxyhydroxide, β-iron oxyhydroxide, γ-iron oxyhydroxide, δ-iron oxyhydroxide, or any two or more thereof.

Examples of the molybdenum-containing compound include a molybdenum oxide and a cobalt-molybdenum composite oxide. Note that a material belonging to the molybdenum-containing compound is excluded from each of the titanium-containing compound, the niobium-containing compound, the vanadium-containing compound, and the iron-containing compound.

Specific examples of the molybdenum oxide include molybdenum dioxide ($MoO_2$). Specific examples of the cobalt-molybdenum composite oxide include $CoMoO_4$.

In particular, the negative electrode 14 preferably includes the negative electrode active material which the alkali metal ion is to be inserted into and extracted from at a potential, versus the standard hydrogen reference electrode, of lower than or equal to 0 V. Specific examples of the negative electrode active material include $TiO_2$, $Li_4Ti_5O_{12}$, $Li_4Ti_{4.95}Nb_{0.05}O_{12}$, and $NaTi_2(PO_4)_3$. A reason for this is that, in the capacity restoring process of the secondary battery to be described later, a potential range is increased in which a capacity restoring reaction spontaneously proceeds between the negative electrode 14 and the negative electrode capacity restoring electrode 17 even if almost no potential is applied by an external electric power source. This makes it easier for the capacity restoring reaction of the secondary battery to proceed with extremely small power consumption, and also makes it easier for the battery capacity to be restored in the capacity restoring process.

The positive electrode electrolytic solution 15 is contained in the positive electrode compartment S1, and the negative electrode electrolytic solution 16 is contained in the negative electrode compartment S2. The positive electrode electrolytic solution 15 and the negative electrode electrolytic solution 16 are therefore separated from each other with the partition 12 interposed therebetween in such a manner as not to be mixed with each other.

Here, the positive electrode electrolytic solution 15 is contained in the positive electrode compartment S1 in such a manner that there is no space in which the positive electrode electrolytic solution 15 is absent, and the negative electrode electrolytic solution 16 is contained in the negative electrode compartment S2 in such a manner that there is no space in which the negative electrode electrolytic solution 16 is absent. In other words, the positive electrode compartment S1 is filled with the positive electrode electrolytic solution 15, and the negative electrode compartment S2 is filled with the negative electrode electrolytic solution 16. In this case: the positive electrode active material layer 13B is immersed in the positive electrode electrolytic solution 15, and the entire positive electrode active material layer 13B is thus in contact with the positive electrode electrolytic solution 15; and the negative electrode active material layer 14B is immersed in the negative electrode electrolytic solution 16, and the entire negative electrode active material layer 14B is thus in contact with the negative electrode electrolytic solution 16.

Specifically, the positive electrode electrolytic solution 15 and the negative electrode electrolytic solution 16 each include the aqueous solvent and one or more of ionic materials that are ionizable in the aqueous solvent. The positive electrode electrolytic solution 15 further includes the alkali metal ion that is to be inserted into and extracted from each of the positive electrode 13 and the negative electrode 14, and the negative electrode electrolytic solution 16 further includes the alkali metal ion that is to be inserted into and extracted from each of the positive electrode 13 and the negative electrode 14.

The aqueous solvent is not limited to a particular kind, and specific examples thereof include pure water. The ionic material is not limited to a particular kind, and specifically includes one or more of materials including, without limitation, an acid, a base, and an electrolyte salt. Specific examples of the acid include carbonic acid, oxalic acid, nitric acid, sulfuric acid, hydrochloric acid, acetic acid, and citric acid.

The electrolyte salt is a salt including a cation and an anion. More specifically, the electrolyte salt includes one or more of metal salts. The metal salts are not limited to particular kinds, and specific examples thereof include an alkali metal salt, an alkaline earth metal salt, and a transition metal salt.

Examples of the alkali metal salt include a lithium salt, a sodium salt, and a potassium salt. Specific examples of the lithium salt include lithium carbonate, lithium oxalate, lithium nitrate, lithium sulfate, lithium chloride, lithium acetate, lithium citrate, lithium hydroxide, and an imide salt. Examples of the imide salt include lithium bis(fluorosulfonyl)imide and lithium bis(trifluoromethane sulfonyl)imide. Specific examples of the sodium salt include compounds that include sodium in place of lithium in the above-described specific examples of the lithium salt. Specific examples of the potassium salt include compounds that include potassium in place of lithium in the above-described specific examples of the lithium salt.

The alkaline earth metal salt is not limited to a particular kind, and specific examples thereof include compounds that include an alkaline earth metal element in place of lithium in the above-described lithium salts. Examples of the alkaline earth metal salt include a calcium salt. The transition metal salt is not limited to a particular kind, and specific examples thereof include compounds that include a transition metal element in place of lithium in the above-described lithium salts.

A content of the ionic material, i.e., a concentration (mol/kg) of each of the positive electrode electrolytic solution 15 and the negative electrode electrolytic solution 16, may be set as desired.

A composition (i.e., a kind of the aqueous solvent and a kind of the electrolyte salt) of the positive electrode electrolytic solution 15 and a composition (i.e., a kind of the aqueous solvent and a kind of the electrolyte salt) of the negative electrode electrolytic solution 16 may be the same as or different from each other.

Here, a pH of the positive electrode electrolytic solution 15 and a pH of the negative electrode electrolytic solution 16 may be equal to or different from each other. In other words, the pH of the negative electrode electrolytic solution 16 may be lower than the pH of the positive electrode electrolytic solution 15, may be equal to the pH of the positive electrode electrolytic solution 15, or may be higher than the pH of the positive electrode electrolytic solution 15.

In particular, the pH of the negative electrode electrolytic solution 16 is preferably higher than the pH of the positive electrode electrolytic solution 15. A reason for this is that a decomposition potential of the aqueous solvent shifts as compared with a case where the pH of the negative electrode electrolytic solution 16 is lower than or equal to the pH of the positive electrode electrolytic solution 15. This widens a potential window of the aqueous solvent while thermodynamically suppressing a decomposition reaction of the aqueous solvent upon charging and discharging. Accordingly, the charging and discharging reactions utilizing insertion and extraction of the alkali metal ion proceed sufficiently and stably while a high voltage is obtained. Another reason is that, in the capacity restoring process of the secondary battery to be described later, the potential range is increased in which the capacity restoring reaction spontaneously proceeds even if almost no potential is applied by an external electric power source. This makes it easier for the capacity restoring reaction of the secondary battery to proceed with extremely small power consumption, and also makes it easier for the battery capacity to be restored in the capacity restoring process.

Thus, it is preferable that the composition (i.e., the kind of the electrolyte salt) of the positive electrode electrolytic solution 15 and the composition (i.e., the kind of the electrolyte salt) of the negative electrode electrolytic solution 16 be different from each other. A reason for this is that this makes it easier to control the pH of the positive electrode electrolytic solution 15 and the pH of the negative electrode electrolytic solution 16 in such a manner that the pH of the negative electrode electrolytic solution 16 is higher than the pH of the positive electrode electrolytic solution 15.

The value of the pH of each of the negative electrode electrolytic solution 16 and the positive electrode electrolytic solution 15 is not particularly limited as long as the pH of the negative electrode electrolytic solution 16 is higher than the pH of the positive electrode electrolytic solution 15.

In particular, the pH of the negative electrode electrolytic solution 16 is preferably higher than or equal to 11, more preferably higher than or equal to 12, and still more preferably higher than or equal to 13. A reason for this is that this allows the negative electrode electrolytic solution 16 to have a sufficiently high pH, therefore making it easier for the pH of the negative electrode electrolytic solution 16 to be higher than the pH of the positive electrode electrolytic solution 15. Another reason is that this provides a sufficiently large difference between the pH of the positive electrode electrolytic solution 15 and the pH of the negative electrode electrolytic solution 16, therefore making it easier to maintain the high-and-low relationship between the pHs of the two electrolytic solutions. Still another reason is that, in the capacity restoring process of the secondary battery to be described later, the potential range is increased in which the capacity restoring reaction spontaneously proceeds even if almost no potential is applied by an external electric power source. This makes it easier for the capacity restoring reaction of the secondary battery to proceed with extremely small power consumption, and also makes it easier for the battery capacity to be restored in the capacity restoring process.

The pH of the positive electrode electrolytic solution 15 is preferably within a range from 3 to 8 both inclusive, more preferably within a range from 4 to 8 both inclusive, and still more preferably within a range from 4 to 6 both inclusive. A reason for this is that this provides a sufficiently large difference between the pH of the positive electrode electrolytic solution 15 and the pH of the negative electrode electrolytic solution 16, therefore making it easier to maintain the high-and-low relationship between the pHs of the two electrolytic solutions. Another reason is that this suppresses corrosion of the outer package member 11, and also suppresses corrosion of a battery component member such as the positive electrode current collector 13A or the negative electrode current collector 14A, therefore improving electrochemical durability or stability of the secondary battery. Still another reason is that, as with the reason for the case where the pH of the negative electrode electrolytic solution 16 is higher than or equal to 11, this makes it easier for the capacity restoring reaction of the secondary battery to proceed with extremely small power consumption, and also makes it easier for the battery capacity to be restored in the capacity restoring process.

The electrolyte salt includes an alkali metal salt including, as a cation, the alkali metal ion to be inserted into and extracted from each of the positive electrode 13 and the negative electrode 14. In this case, the electrolyte salt may further include one or more of materials including optional electrolyte salts and a non-electrolyte. Note that the above-described alkali metal salt including the alkali metal ion to be inserted into and extracted from each of the positive electrode 13 and the negative electrode 14 as a cation is excluded from the above-described optional electrolyte salts. Kinds of the optional electrolyte salts (kinds of cations and kinds of anions) are not particularly limited and may be selected as desired.

Here, as described above, each of the positive electrode electrolytic solution 15 and the negative electrode electrolytic solution 16 includes the alkali metal ion to be inserted into and extracted from each of the positive electrode 13 and the negative electrode 14 as a cation, that is, each of the positive electrode electrolytic solution 15 and the negative electrode electrolytic solution 16 includes the alkali metal salt that includes the alkali metal ion as a cation. The alkali metal salt is not limited to a particular kind. Therefore, only one kind of alkali metal salt may be used, or two or more kinds of alkali metal salts may be used.

In this case, the positive electrode electrolytic solution 15, the negative electrode electrolytic solution 16, or each of the positive electrode electrolytic solution 15 and the negative electrode electrolytic solution 16 may further include one or more of other metal salts. The other metal salts each include, as a cation, another metal ion different from the alkali metal ion to be inserted into and extracted from each of the positive electrode 13 and the negative electrode 14. The other metal ion may be a metal ion to be inserted into and extracted from each of the positive electrode 13 and the negative electrode 14, may be a metal ion not to be inserted into and extracted from each of the positive electrode 13 and the negative electrode 14, or may be both.

The other metal ion that is the metal ion to be inserted into and extracted from each of the positive electrode 13 and the negative electrode 14 is not limited to a particular kind. Therefore, only one kind of such a metal ion may be used, or two or more kinds of such metal ions may be used. Examples of the other metal ion in this case include an alkali metal ion other than the alkali metal ion to be inserted into and extracted from each of the positive electrode 13 and the negative electrode 14.

The other metal ion that is the metal ion not to be inserted into and extracted from each of the positive electrode 13 and the negative electrode 14 is not limited to a particular kind. Therefore, only one kind of such a metal ion may be used, or two or more kinds of such metal ions may be used. Examples of the other metal ion in this case include one or more of freely-selected metal ions including, without limitation, an alkali metal ion other than the alkali metal ion to be inserted into and extracted from each of the positive electrode 13 and the negative electrode 14, an alkaline earth metal ion, a transition metal ion, and any other metal ion.

More specifically, the positive electrode electrolytic solution 15, the negative electrode electrolytic solution 16, or each of the positive electrode electrolytic solution 15 and the negative electrode electrolytic solution 16 includes a lithium salt including a lithium ion serving as a cation, as the alkali metal salt including the alkali metal ion to be inserted into and extracted from each of the positive electrode 13 and the negative electrode 14 serving as a cation.

In this case, the positive electrode electrolytic solution 15, the negative electrode electrolytic solution 16, or each of the positive electrode electrolytic solution 15 and the negative electrode electrolytic solution 16 preferably further includes one or more of the above-described other metal salts each including the other metal ion serving as a cation. A reason for this is that the combination use of two or more metal salts, i.e., the alkali metal salt and the other metal salt, makes it easier to control each of the pH of the positive electrode electrolytic solution 15 and the pH of the negative electrode electrolytic solution 16, as compared with a case of using only one metal salt, i.e., only the alkali metal salt.

In particular, the positive electrode electrolytic solution 15, the negative electrode electrolytic solution 16, or each of the positive electrode electrolytic solution 15 and the negative electrode electrolytic solution 16 preferably includes: a lithium salt (a lithium ion) which is the alkali metal salt; and a sodium salt (a sodium ion), a potassium salt (a potassium ion), or both which are the other metal salts. A reason for this is that this makes it easier to control the pH of the negative electrode electrolytic solution 16 to be sufficiently higher than the pH of the positive electrode electrolytic solution 15, and therefore makes it easier to maintain the high-and-low relationship between the pHs of the two electrolytic solutions.

Note that the positive electrode electrolytic solution 15, the negative electrode electrolytic solution 16, or each of the positive electrode electrolytic solution 15 and the negative electrode electrolytic solution 16 is preferably a saturated solution of the alkali metal salt including the alkali metal ion to be inserted into and extracted from each of the positive electrode 13 and the negative electrode 14 as a cation. In particular, it is more preferable that each of the positive electrode electrolytic solution 15 and the negative electrode electrolytic solution 16 be the above-described saturated solution of the alkali metal salt. A reason for this is that the charging and discharging reactions, i.e., the insertion and extraction reactions of the alkali metal ion, proceed stably upon charging and discharging.

In order to check whether the positive electrode electrolytic solution 15 is the saturated solution of the electrolyte salt, i.e., the alkali metal salt, the secondary battery may be disassembled, following which whether the electrolyte salt is deposited in an inside of the positive electrode compartment S1 may be checked. Specific examples of the inside of the positive electrode compartment S1 include a location in the positive electrode electrolytic solution 15, a location on a surface of the partition 12, a location on a surface of the positive electrode 13, and a location on an inner wall surface of the outer package member 11. If the electrolyte salt is deposited and the positive electrode electrolytic solution 15, which is a liquid, and the deposited matter of the electrolyte salt, which is a solid, therefore coexist in the inside of the positive electrode compartment S1, it is conceivable that the positive electrode electrolytic solution 15 is a saturated solution of the electrolyte salt. In order to examine a composition of the deposited matter, a surface analysis method such as X-ray photoelectron spectroscopy (XPS) is used, or a composition analysis method such as inductively coupled plasma (ICP) optical emission spectroscopy is used.

A method of checking whether the negative electrode electrolytic solution 16 is a saturated solution of the electrolyte salt, i.e., the alkali metal salt, is similar to the above-described method of checking whether the positive electrode electrolytic solution 15 is a saturated solution of the electrolyte salt, i.e., the alkali metal salt, except that an inside of the negative electrode compartment S2 is checked instead of the inside of the positive electrode compartment S1.

Further, the positive electrode electrolytic solution 15 and the negative electrode electrolytic solution 16 may each be a pH buffer solution. The pH buffer solution may be an aqueous solution in which a weak acid and a conjugate base thereof are mixed together, or an aqueous solution in which a weak base and a conjugate acid thereof are mixed together. A reason for this is that this sufficiently suppresses variation in pH, and therefore makes it easier to maintain each of the pH of the positive electrode electrolytic solution 15 and the pH of the negative electrode electrolytic solution 16 described above.

In particular, the positive electrode electrolytic solution 15 preferably includes one or more of a sulfuric acid ion, a hydrogen sulfuric acid ion, a nitric acid ion, a carbonic acid ion, a hydrogen carbonic acid ion, a phosphoric acid ion, a monohydrogen phosphoric acid ion, a dihydrogen phosphoric acid ion, or a carboxylic acid ion as one or more anions. A reason for this is that this sufficiently suppresses variation in pH of the positive electrode electrolytic solution 15, therefore making it easier to sufficiently maintain each of the pH of the positive electrode electrolytic solution 15 and the pH of the negative electrode electrolytic solution 16 described above. The carboxylic acid ion includes one or more of ions including, without limitation, a formic acid ion, an acetic acid ion, a propionic acid ion, a tartaric acid ion, and a citric acid ion.

Note that the positive electrode electrolytic solution 15 and the negative electrode electrolytic solution 16 may each include one or more of materials including, without limitation, tris(hydroxymethyl)aminomethane and ethylenediaminetetraacetic acid as one or more buffers.

More specifically, it is preferable that the positive electrode electrolytic solution 15 include one or more of a sulfuric acid ion, a hydrogen sulfuric acid ion, a nitric acid ion, a carbonic acid ion, a hydrogen carbonic acid ion, a phosphoric acid ion, a monohydrogen phosphoric acid ion, or a dihydrogen phosphoric acid ion as one or more anions, and the negative electrode electrolytic solution 16 include a hydroxide ion as an anion. A reason for this is that this makes it easier to control the pH of the positive electrode electrolytic solution 15 to be sufficiently low and to control the pH of the negative electrode electrolytic solution 16 to be sufficiently high.

Here, the positive electrode electrolytic solution 15 and the negative electrode electrolytic solution 16 are preferably isotonic solutions that are isotonic with each other. A reason for this is that this makes osmotic pressure of each of the positive electrode electrolytic solution 15 and the negative electrode electrolytic solution 16 appropriate, and therefore makes it easier to maintain the high-and-low relationship between the pHs of the two electrolytic solutions.

Note that the pH of the positive electrode electrolytic solution 15 is preferably so set as to prevent each of the positive electrode current collector 13A and the positive electrode active material layer 13B from being corroded easily. Similarly, the pH of the negative electrode electrolytic solution 16 is preferably so set as to prevent each of the negative electrode current collector 14A and the negative electrode active material layer 14B from being corroded easily. A reason for this is that this makes it easier for the charging and discharging reactions using the positive electrode 13 and the negative electrode 14 to proceed stably and continuously.

The negative electrode capacity restoring electrode 17 is disposed in the positive electrode compartment S1 in such a manner as to be separated from the positive electrode 13. The negative electrode capacity restoring electrode 17 may be, unlike the positive electrode 13, an electrode which the alkali metal ion is not to be inserted into or extracted from, or may be, as with the positive electrode 13, an electrode which the alkali metal ion is to be inserted into and extracted from.

Here, a portion of the negative electrode capacity restoring electrode 17 is immersed in the positive electrode electrolytic solution 15. The negative electrode capacity restoring electrode 17 is thus in contact with the positive electrode electrolytic solution 15.

In particular, the negative electrode capacity restoring electrode 17 is an electrode to which switching is performed from the positive electrode 13 to be energized together with the negative electrode 14 in the capacity restoring process of the secondary battery to be described later. The negative electrode capacity restoring electrode 17 is thereby coupled to the negative electrode 14 and is energized together with the negative electrode 14.

The negative electrode capacity restoring electrode 17 includes a hydrogen-generating material, an oxygen-reducing material, or both. Accordingly, the negative electrode capacity restoring electrode 17 is used to restore the battery capacity that is decreased as a result of charging and discharging of the secondary battery, by restoring a power margin of the negative electrode 14 for charging.

The hydrogen-generating material is a material that generates hydrogen in response to energization of the negative electrode capacity restoring electrode 17. The negative electrode capacity restoring electrode 17 including the hydrogen-generating material generates hydrogen in the positive electrode electrolytic solution 15, thereby causing a reaction which extracts the alkali metal ion from the negative electrode 14, i.e., the discharging reaction, to occur.

Specifically, the hydrogen-generating material includes one or more of materials including, without limitation, platinum, iridium, nickel, iron, and palladium as one or more constituent elements. A reason for this is that hydrogen is easily generated at a low voltage in the hydrogen-generating material, which makes it easier for the negative electrode capacity restoring electrode 17 to generate a sufficient amount of hydrogen.

Note that the hydrogen-generating material may be a simple substance (a metal material), an alloy, a compound such as an oxide, or a composite material of two or more thereof. Further, the hydrogen-generating material may be a material in which particles each including the hydrogen-generating material are supported by an electrically conductive substrate (a current collector foil).

The oxygen-reducing material is a material that reduces oxygen in response to the energization of the negative electrode capacity restoring electrode 17. The negative electrode capacity restoring electrode 17 including the oxygen-reducing material reduces oxygen in the positive electrode electrolytic solution 15, thereby causing the reaction which extracts the alkali metal ion from the negative electrode 14, i.e., the discharging reaction, to occur.

Usable as the oxygen-reducing material are materials including, without limitation, a material used as a catalyst of an air electrode (an oxygen electrode) in a fuel battery. Specifically, the oxygen-reducing material includes one or more of materials including, without limitation, platinum, a platinum-ruthenium alloy, porous carbon, niobium oxide, tin oxide, and titanium oxide. A reason for this is that oxygen is easily reduced at a low voltage in the oxygen-reducing material, which makes it easier for the negative electrode capacity restoring electrode 17 to reduce a sufficient amount of oxygen.

Note that the oxygen-reducing material may be a material in which particles each including the oxygen-reducing material are supported by an electrically conductive substrate (a current collector foil). The oxygen-reducing material in this case includes one or more of materials including, without limitation, niobium oxide, tin oxide, and titanium oxide described above.

Note that a material such as platinum serves as both the hydrogen-generating material and the oxygen-reducing material (hereinafter, referred to as a "hydrogen-generating and oxygen-reducing material"). In a case where the hydrogen-generating and oxygen-reducing material is used, hydrogen is generated and oxygen is reduced in response to the energization of the negative electrode capacity restoring electrode 17.

A portion of the negative electrode capacity restoring electrode 17, as with the coupling terminal part 13AT, is led out of the outer package member 11. A direction in which the negative electrode capacity restoring electrode 17 is led out is not particularly limited, and is specifically similar to the direction in which the coupling terminal part 13AT is led out.

In order to separate the negative electrode capacity restoring electrode 17 from the positive electrode 13, an unillustrated separator may be disposed between the positive electrode 13 and the negative electrode capacity restoring electrode 17. The separator is a porous film including one or more of insulating materials including, without limitation, a synthetic resin and ceramics, and may be a stacked film in which two or more kinds of porous films are stacked on each other. Specific examples of the synthetic resin include polypropylene and a polypropylene nonwoven fabric.

The positive electrode capacity restoring electrode 18 is disposed in the negative electrode compartment S2 in such a manner as to be separated from the negative electrode 14. The positive electrode capacity restoring electrode 18 may be, unlike the negative electrode 14, an electrode which the alkali metal ion is not to be inserted into or extracted from, or may be, as with the negative electrode 14, an electrode which the alkali metal ion is to be inserted into and extracted from.

Here, a portion of the positive electrode capacity restoring electrode 18 is immersed in the negative electrode electrolytic solution 16. The positive electrode capacity restoring electrode 18 is thus in contact with the negative electrode electrolytic solution 16.

In particular, the positive electrode capacity restoring electrode 18 is an electrode to which switching is performed from the negative electrode 14 to be energized together with the positive electrode 13 in the capacity restoring process of the secondary battery to be described later. The positive electrode capacity restoring electrode 18 is thereby coupled to the positive electrode 13 and is energized together with the positive electrode 13.

The positive electrode capacity restoring electrode 18 includes an oxygen-generating material, a hydrogen-oxidizing material, or both. Accordingly, the positive electrode capacity restoring electrode 18 is used to restore the battery capacity that is decreased as a result of charging and discharging of the secondary battery, by restoring a power margin of the positive electrode 13 for charging.

The oxygen-generating material is a material that generates oxygen in response to energization of the positive electrode capacity restoring electrode 18. The positive electrode capacity restoring electrode 18 including the oxygen-generating material generates oxygen in the negative electrode electrolytic solution 16, thereby causing a reaction which inserts the alkali metal ion into the positive electrode 13, i.e., the discharging reaction, to occur.

Specifically, the oxygen-generating material includes one or more of materials including, without limitation, nickel, manganese, iridium, palladium, tantalum, and platinum as one or more constituent elements. A reason for this is that oxygen is easily generated at a low voltage in the oxygen-generating material, which makes it easier for the positive electrode capacity restoring electrode 18 to generate a sufficient amount of oxygen. Note that the oxygen-generating material may be a simple substance (a metal material), an alloy, a compound such as an oxide, or a composite material of two or more thereof.

The hydrogen-oxidizing material is a material that oxidizes hydrogen in response to the energization of the positive electrode capacity restoring electrode 18. The positive electrode capacity restoring electrode 18 including the hydrogen-oxidizing material oxidizes hydrogen in the negative electrode electrolytic solution 16, thereby causing the reaction which inserts the alkali metal ion into the positive electrode 13, i.e., the discharging reaction, to occur.

Usable as the hydrogen-oxidizing material are materials including, without limitation, a material used as a catalyst of a fuel electrode (a hydrogen electrode) in a fuel battery. Specifically, the hydrogen-oxidizing material includes one or more of materials including, without limitation, platinum, silver, silver oxide, zirconium oxide, and a nickel-chromium alloy. A reason for this is that hydrogen is easily oxidized at a low voltage in the hydrogen-oxidizing material, which makes it easier for the positive electrode capacity restoring electrode 18 to oxidize a sufficient amount of hydrogen.

Note that a material such as platinum serves as both the oxygen-generating material and the hydrogen-oxidizing material (hereinafter, referred to as an "oxygen-generating and hydrogen-oxidizing material"). In a case where the oxygen-generating and hydrogen-oxidizing material is used, oxygen is generated and hydrogen is oxidized in response to the energization of the positive electrode capacity restoring electrode 18.

A portion of the positive electrode capacity restoring electrode 18, as with the coupling terminal part 14AT, is led out of the outer package member 11. A direction in which the positive electrode capacity restoring electrode 18 is led out is not particularly limited, and is specifically similar to the direction in which the coupling terminal part 14AT is led out.

In order to separate the positive electrode capacity restoring electrode 18 from the negative electrode 14, an unillustrated separator may be disposed between the negative electrode 14 and the positive electrode capacity restoring electrode 18. Details of the separator to be used for the separation are as described above.

The secondary battery performs a charge and discharge process and the capacity restoring process as described below. The charge and discharge process is a process of causing an electrode reaction which is for generating the battery capacity in the secondary battery to proceed. The capacity restoring process is a process of causing an electrode reaction for restoring the battery capacity to proceed when the battery capacity is decreased as a result of charging and discharging of the secondary battery.

In a case of performing the charge and discharge process of the secondary battery, the positive electrode 13 and the negative electrode 14 are coupled to each other.

Upon charging, when the alkali metal ion is extracted from the positive electrode 13, the extracted alkali metal ion moves through the positive electrode electrolytic solution 15, the partition 12, and the negative electrode electrolytic solution 16 in this order to the negative electrode 14. Thus, the alkali metal ion is inserted into the negative electrode 14.

Upon discharging, when the alkali metal ion is extracted from the negative electrode 14, the extracted alkali metal moves through the negative electrode electrolytic solution 16, the partition 12, and the positive electrode electrolytic solution 15 in this order to the positive electrode 13. Thus, the alkali metal ion is inserted into the positive electrode 13.

The capacity restoring process of the secondary battery is performed using one of the negative electrode capacity restoring electrode 17 or the positive electrode capacity restoring electrode 18. The capacity restoring process of the secondary battery described below is performed using a secondary battery control system to be described later.

In a case of performing the capacity restoring process of the positive electrode 13, the positive electrode capacity restoring electrode 18 is used. In this case, the positive electrode capacity restoring electrode 18 is selected instead of the negative electrode 14; therefore, the positive electrode 13 and the positive electrode capacity restoring electrode 18 are coupled to each other, and are energized with each other. The positive electrode 13 is thereby discharged using the positive electrode capacity restoring electrode 18, and the battery capacity is thus restored.

In detail, when the secondary battery is charged and discharged, the aqueous solvent in the negative electrode electrolytic solution 16 is decomposed on the negative electrode 14 during charging, and thus, hydrogen is generated. In this case, the negative electrode 14 is discharged, and thus, the potential is shifted to a high potential side. This causes a charged state of the negative electrode 14 to shift from a charged state of the positive electrode 13, which decreases an amount of lithium ions to be inserted and extracted in the secondary battery. Thus, the battery capacity decreases.

In contrast, in the capacity restoring process of the positive electrode 13, the positive electrode 13 is discharged using the positive electrode capacity restoring electrode 18. Specifically, in a case where the positive electrode capacity restoring electrode 18 includes the oxygen-generating material, the water in the negative electrode electrolytic solution 16 is oxidized. Thus, the positive electrode 13 is discharged while oxygen is generated. In a case where the positive electrode capacity restoring electrode 18 includes the hydrogen-oxidizing material, hydrogen dissolved in the negative electrode electrolytic solution 16 is oxidized. Thus, the positive electrode 13 is discharged while hydrogen is consumed. This makes it possible to bring the charged state of the positive electrode 13 close to the charged state of the negative electrode 14, which helps to restore (increase) the amount of lithium ions to be inserted and extracted in the secondary battery. Accordingly, the capacity restoring reaction proceeds, and the battery capacity is thus restored.

Note that, in a case where the positive electrode capacity restoring electrode 18 includes the oxygen-generating and hydrogen-oxidizing material such as platinum, hydrogen is consumed while oxygen is generated by using only one kind of material as a component material of the positive electrode capacity restoring electrode 18.

In a case of performing the capacity restoring process of the negative electrode 14, the negative electrode capacity restoring electrode 17 is used. In this case, the negative electrode capacity restoring electrode 17 is selected instead of the positive electrode 13; therefore, the negative electrode 14 and the negative electrode capacity restoring electrode 17 are coupled to each other, and are energized with each other. The negative electrode 14 is thereby discharged using the negative electrode capacity restoring electrode 17, and the battery capacity is thus restored.

In detail, when the secondary battery is charged and discharged, the aqueous solvent in the positive electrode electrolytic solution 15 is decomposed on the positive electrode 13 during charging, and thus, oxygen is generated. In this case, the positive electrode 13 is discharged, and thus, the potential is shifted to a low potential side. This causes the charged state of the positive electrode 13 to shift from the charged state of the negative electrode 14, which decreases an amount of lithium ions to be inserted and extracted in the secondary battery. Thus, the battery capacity decreases.

In contrast, in the capacity restoring process of the negative electrode 14, the negative electrode 14 is discharged using the negative electrode capacity restoring electrode 17. Specifically, in a case where the negative electrode capacity restoring electrode 17 includes the hydrogen-generating material, the water in the positive electrode electrolytic solution 15 is reduced. Thus, the negative electrode 14 is discharged while hydrogen is generated. In a case where the negative electrode capacity restoring electrode 17 includes the oxygen-reducing material, oxygen dissolved in the positive electrode electrolytic solution 15 is reduced. Thus, the negative electrode 14 is discharged while oxygen is consumed. This makes it possible to bring the charged state of the negative electrode 14 close to the charged state of the positive electrode 13, which helps to restore (increase) the amount of lithium ions to be inserted and extracted in the secondary battery. Accordingly, the capacity restoring reaction proceeds, and the battery capacity is thus restored.

Note that, in a case where the negative electrode capacity restoring electrode 17 includes the hydrogen-generating and oxygen-reducing material such as platinum, oxygen is consumed while hydrogen is generated by using only one kind of material as a component material of the negative electrode capacity restoring electrode 17.

In a case of manufacturing the secondary battery, the positive electrode 13 and the negative electrode 14 are each fabricated and the positive electrode electrolytic solution 15 and the negative electrode electrolytic solution 16 are each prepared, following which the secondary battery is fabricated, as described below according to an embodiment.

First, the positive electrode active material is mixed with materials including, without limitation, the positive electrode binder and the positive electrode conductor to thereby obtain a positive electrode mixture. Thereafter, the positive electrode mixture is put into the aqueous solvent to thereby prepare a paste positive electrode mixture slurry. Lastly, the positive electrode mixture slurry is applied on the two opposed surfaces of the positive electrode current collector 13A (excluding the coupling terminal part 13AT) to thereby form the positive electrode active material layers 13B. Thereafter, the positive electrode active material layers 13B may be compression-molded by means of, for example, a roll pressing machine. In this case, the positive electrode active material layers 13B may be heated. The positive electrode active material layers 13B may be compression-molded multiple times. Thus, the positive electrode 13 is fabricated.

The negative electrode active material layers 14B are formed on the respective two opposed surfaces of the negative electrode current collector 14A by a procedure similar to the procedure for fabricating the positive electrode 13 described above. Specifically, the negative electrode active material is mixed with materials including, without limitation, the negative electrode binder and the negative electrode conductor to thereby obtain a negative electrode mixture. Thereafter, the negative electrode mixture is put into the aqueous solvent to thereby prepare a paste negative electrode mixture slurry. Thereafter, the negative electrode mixture slurry is applied on the two opposed surfaces of the negative electrode current collector 14A (excluding the coupling terminal part 14AT) to thereby form the negative electrode active material layers 14B. Thereafter, the negative electrode active material layers 14B may be compression-molded. Thus, the negative electrode 14 is fabricated.

The ionic material is added to the aqueous solvent to thereby prepare each of the positive electrode electrolytic solution 15 and the negative electrode electrolytic solution 16.

First, the outer package member 11 (the positive electrode compartment S1 and the negative electrode compartment S2) in which the partition 12 is attached in advance to an inside thereof is prepared. Thereafter, the positive electrode 13 and the negative electrode capacity restoring electrode 17 are each placed into the positive electrode compartment S1, and the negative electrode 14 and the positive electrode capacity restoring electrode 18 are each placed into the negative electrode compartment S2. In this case, the coupling terminal part 13AT is led out of the positive electrode compartment S1, and the coupling terminal part 14AT is led out of the negative electrode compartment S2. Further, a portion of the negative electrode capacity restoring electrode 17 is led out of the positive electrode compartment S1, and a portion of the positive electrode capacity restoring electrode 18 is led out of the negative electrode compartment S2. Lastly, the positive electrode electrolytic solution 15 is supplied into the positive electrode compartment S1 through an unillustrated positive electrode injection hole that is in communication with the positive electrode compartment S1, and the negative electrode electrolytic solution 16 is supplied into the negative electrode compartment S2 through an unillustrated negative electrode injection hole that is in communication with the negative electrode compartment S2. Thereafter, the positive electrode injection hole and the negative electrode injection hole are each sealed.

Thus, the positive electrode electrolytic solution 15 is contained in the positive electrode compartment S1 in which the positive electrode 13 and the negative electrode capacity restoring electrode 17 are each disposed, and the negative electrode electrolytic solution 16 is contained in the negative electrode compartment S2 in which the negative electrode 14 and the positive electrode capacity restoring electrode 18 are each disposed. As a result, the secondary battery including the two aqueous electrolytic solutions (i.e., the positive electrode electrolytic solution 15 and the negative electrode electrolytic solution 16) is completed.

The secondary battery includes the positive electrode 13, the negative electrode 14, the two aqueous electrolytic solutions (i.e., the positive electrode electrolytic solution 15 and the negative electrode electrolytic solution 16), the negative electrode capacity restoring electrode 17, and the positive electrode capacity restoring electrode 18. The negative electrode capacity restoring electrode 17 includes the hydrogen-generating material, the oxygen-reducing material, or both, and the positive electrode capacity restoring electrode 18 includes the oxygen-generating material, the hydrogen-oxidizing material, or both.

In this case, as described above, when the secondary battery is charged and discharged, even if the battery capacity decreases due to the rise in the potential of the positive electrode 13, the potential of the positive electrode 13 decreases as a result of the positive electrode 13 and the positive electrode capacity restoring electrode 18 being energized with each other. Thus, the battery capacity is restored.

Further, as described above, when the secondary battery is charged and discharged, even if the battery capacity decreases due to the rise in the potential of the negative electrode 14, the potential of the negative electrode 14 increases as a result of the negative electrode 14 and the negative electrode capacity restoring electrode 17 being energized with each other. Thus, the battery capacity is restored.

Based upon the foregoing, even if the battery capacity decreases due to the use of the secondary battery, the state of the positive electrode 13 and the state of the negative electrode 14 are restored by using the positive electrode capacity restoring electrode 18 and the negative electrode capacity restoring electrode 17, respectively. This makes it possible to restore the battery capacity.

In this case, it is not necessary to add a specific additive to each of the positive electrode electrolytic solution 15 and the negative electrode electrolytic solution 16 in order to restore the battery capacity. Further, the battery capacity is restored repeatedly as long as the aqueous solvent included in each of the positive electrode electrolytic solution 15 and the negative electrode electrolytic solution 16 is not exhausted. Accordingly, it is possible to restore the battery capacity easily and continuously.

In particular, the hydrogen-generating material may include one or more of platinum, iridium, nickel, iron, or palladium as one or more constituent elements. This makes it easier to generate a sufficient amount of hydrogen at a low voltage. Accordingly, it is possible to achieve higher effects. The oxygen-reducing material may include one or more of platinum, a platinum-ruthenium alloy, porous carbon, niobium oxide, silicon oxide, or titanium oxide. This makes it easier to reduce a sufficient amount of oxygen at a low voltage. Accordingly, it is possible to achieve higher effects.

Further, the oxygen-generating material may include one or more of nickel, manganese, iridium, palladium, tantalum, or platinum as one or more constituent elements. This makes it easier to generate a sufficient amount of oxygen at a low voltage. Accordingly, it is possible to achieve higher effects. The hydrogen-oxidizing material may include one or more of platinum, silver, silver oxide, zirconium oxide, or a nickel-chromium alloy. This makes it easier to reduce a sufficient amount of hydrogen at a low voltage. Accordingly, it is possible to achieve higher effects.

Further, the positive electrode 13 may include the positive electrode active material which the alkali metal ion is to be inserted into and extracted from at a potential, versus the standard hydrogen reference electrode, of higher than or equal to 0.4 V. This makes it easier for the capacity restoring reaction to proceed between the positive electrode 13 and the positive electrode capacity restoring electrode 18 with extremely small power consumption, and also makes it easier for the battery capacity to be restored in the capacity restoring process. Accordingly, it is possible to achieve higher effects.

Similarly, the negative electrode 14 may include the negative electrode active material which the alkali metal ion is to be inserted into and extracted from at a potential, versus the standard hydrogen reference electrode, of lower than or equal to 0 V. This makes it easier for the capacity restoring reaction to proceed between the negative electrode 14 and the negative electrode capacity restoring electrode 17 with extremely small power consumption, and also makes it easier for the battery capacity to be restored in the capacity restoring process. Accordingly, it is possible to achieve higher effects.

Further, the pH of the negative electrode electrolytic solution 16 may be higher than the pH of the positive electrode electrolytic solution 15. This makes it easier for the capacity restoring process of the secondary battery to proceed with extremely small power consumption, and also makes it easier for the battery capacity to be restored in the capacity restoring process. Accordingly, it is possible to achieve higher effects. In this case, the pH of the positive electrode electrolytic solution 15 may be within a range from 3 to 8 both inclusive and the pH of the negative electrode electrolytic solution 16 may be higher than or equal to 11. This makes it easier for the capacity restoring reaction to proceed sufficiently, and also makes it easier for the battery capacity to be restored sufficiently in the capacity restoring process. Accordingly, it is possible to achieve further higher effects.

Next, the secondary battery control system using the above-described secondary battery will be described according to an embodiment.

The secondary battery control system is a system that restores the battery capacity of the secondary battery by performing the capacity restoring process using the secondary battery. In the following, reference is made, where appropriate, to FIG. 1 which has been described above, and to the components of the secondary battery which have been described above.

FIG. 2 illustrates a block configuration of the secondary battery control system. In FIG. 2, a state is illustrated in which a secondary battery 1 serving as the secondary battery described above is attached (coupled) to the secondary battery control system, and the secondary battery 1 is lightly shaded.

As illustrated in FIG. 2, the secondary battery control system includes a controller 21, an attachment part 22, and coupling wiring lines 23 to 26.

In FIG. 2, the controller 21 and the attachment part 22 are separated from each other. However, the controller 21 and the attachment part 22 may be integrated with each other.

The controller 21 is a control circuit that generally manages and executes the capacity restoring process of the secondary battery, and includes, for example, a central processing unit (CPU) and a memory. When the secondary battery 1 is attached to the attachment part 22, the controller 21 is coupled to the secondary battery 1 via the coupling wiring lines 23 to 26. The controller 21 is thereby coupled to the positive electrode 13, the negative electrode 14, the negative electrode capacity restoring electrode 17, and the positive electrode capacity restoring electrode 18 via the coupling wiring lines 23 to 26, and is thus able to energize each of the positive electrode 13, the negative electrode 14, the negative electrode capacity restoring electrode 17, and the positive electrode capacity restoring electrode 18.

The controller 21 may include a potentiostat, a galvanostat, or both. Each of the potentiostat and the galvanostat is coupled to two or more of the positive electrode 13, the negative electrode 14, the negative electrode capacity restoring electrode 17, the positive electrode capacity restoring electrode 18, or a reference electrode to be described later. Accordingly, one or more of a voltage, a current, or electric power may be kept constant upon energization for performing the capacity restoring process.

Further, the controller 21 may include an instrument that detects a potential of each electrode and detects a current between electrodes coupled to each other. Specifically, the instrument is, for example, a current detector or a current measuring unit to which one or more of the positive electrode 13, the negative electrode 14, the negative electrode capacity restoring electrode 17, the positive electrode capacity restoring electrode 18, or the reference electrode are coupled.

This makes it possible for the controller 21 to control the energization upon the capacity restoring process while referring to: a potential difference between two or more electrodes out of the positive electrode 13, the negative electrode 14, the negative electrode capacity restoring electrode 17, the positive electrode capacity restoring electrode 18, and the reference electrode; and a current and electric power flowing between the electrodes.

Specifically, the controller 21 causes the positive electrode 13 and the positive electrode capacity restoring electrode 18 to be coupled to each other, and thereafter causes the positive electrode 13 and the positive electrode capacity restoring electrode 18 to energize each other, which makes it possible to perform the capacity restoring process. Further, the controller 21 causes the negative electrode 14 and the negative electrode capacity restoring electrode 17 to be coupled to each other, and thereafter causes the negative electrode 14 and the negative electrode capacity restoring electrode 17 to energize each other, which makes it possible to perform the capacity restoring process. In addition, in a case where a value of the current at a time of energization or a value of the voltage between the electrodes coupled to each other reaches a predetermined value, the controller 21 switches a coupling destination in such a manner that the positive electrode 13 and the negative electrode 14 are coupled to each other, which makes it possible to terminate the capacity restoring process.

More specifically, the secondary battery is discharged until a predetermined discharge termination condition is satisfied, following which the controller 21 switches the coupling destination of the positive electrode 13 from the negative electrode 14 to the positive electrode capacity restoring electrode 18, and causes the positive electrode 13 and the positive electrode capacity restoring electrode 18 to energize each other to thereby perform the capacity restoring process. Thereafter, the capacity restoring process is performed in a constant-voltage condition, and in a case where the value of the current at the time of energization becomes smaller than a predetermined value of the current, the controller 21 switches the coupling destination from the positive electrode capacity restoring electrode 18 to the negative electrode 14 to thereby terminate the capacity restoring process.

The attachment part 22 holds the secondary battery 1 and allows the secondary battery 1 to be coupled to the controller 21 via the coupling wiring lines 23 to 26.

The coupling wiring lines 23 to 26 are coupled to the controller 21 and to unillustrated four coupling terminals provided on the attachment part 22. Thus, when the secondary battery 1 is attached to the attachment part 22, the secondary battery 1 is coupled to the controller 21 via the coupling wiring lines 23 to 26.

Specifically, the negative electrode capacity restoring electrode 17 is coupled to the coupling terminal for the coupling wiring line 23. Thus, the negative electrode capacity restoring electrode 17 is coupled to the controller 21 via the coupling wiring line 23. The coupling terminal part 13AT is coupled to the coupling terminal for the coupling wiring line 24. Thus, the positive electrode 13 is coupled to the controller 21 via the coupling wiring line 24. The coupling terminal part 14AT is coupled to the coupling terminal for the coupling wiring line 25. Thus, the negative electrode 14 is coupled to the controller 21 via the coupling wiring line 25. The positive electrode capacity restoring electrode 18 is coupled to the coupling terminal for the coupling wiring line 26. Thus, the positive electrode capacity restoring electrode 18 is coupled to the controller 21 via the coupling wiring line 26.

The secondary battery may further include one or more of unillustrated other components.

Specifically, the secondary battery may include an external electric power source coupled to the controller 21. Note that, as will be described later, in a case where a battery pack includes multiple secondary batteries, the secondary battery other than the secondary battery in which the capacity restoring process is to be performed may be used as the external electric power source. In this case, the number of secondary batteries in which the capacity restoring process is to be performed is not particularly limited as long as it is one or more, and the number of secondary batteries to be used as the external electric power source is also not particularly limited as long as it is one or more.

Further, the secondary battery may include the reference electrode coupled to the controller 21. The reference electrode preferably includes a material having acid resistance, base resistance, oxidation resistance, and reduction resistance. Further, the reference electrode preferably includes a porous material. A reason for this is that a large capacity is obtainable and degradation of the reference electrode caused by self-discharge is suppressed. The reference electrode may be disposed in the positive electrode electrolytic solution 15 or may be disposed in the negative electrode electrolytic solution 16.

In the secondary battery control system, when the secondary battery 1 is attached to the attachment part 22, the secondary battery 1 is coupled to the controller 21. Thus, the controller 21 performs the capacity restoring process of the secondary battery 1 as will be described below.

Specifically, the controller 21 switches the coupling destination of the positive electrode 13 from the negative electrode 14 to the positive electrode capacity restoring electrode 18, and causes the positive electrode 13 and the positive electrode capacity restoring electrode 18 to be coupled to each other to thereby cause the positive electrode 13 and the positive electrode capacity restoring electrode 18 to energize each other. As a result, as described above, the potential of the positive electrode 13 decreases, and thus, the capacity restoring reaction proceeds. Accordingly, the capacity restoring process of the positive electrode 13 is performed. Thus, the battery capacity is restored.

Further, the controller 21 switches the coupling destination of the negative electrode 14 from the positive electrode 13 to the negative electrode capacity restoring electrode 17, and causes the negative electrode 14 and the negative electrode capacity restoring electrode 17 to be coupled to each other to thereby cause the negative electrode 14 and the negative electrode capacity restoring electrode 17 to energize each other. As a result, as described above, the potential of the negative electrode 14 increases, and thus, the capacity restoring reaction proceeds. Accordingly, the capacity restoring process of the negative electrode 14 is performed. Thus, the battery capacity is restored.

Note that the controller 21 may separately perform the capacity restoring process of the positive electrode 13 and the capacity restoring process of the negative electrode 14, or may simultaneously perform the capacity restoring process of the positive electrode 13 and the capacity restoring process of the negative electrode 14.

Further, the controller 21 may perform the capacity restoring process using the external electric power source. Specifically, the controller 21 may perform the capacity restoring process by causing the positive electrode 13 and the positive electrode capacity restoring electrode 18 to energize each other using the external electric power source. Further, the controller 21 may also perform the capacity restoring process by causing the negative electrode 14 and the negative electrode capacity restoring electrode 17 to energize each other using the external electric power source.

The secondary battery control system includes the controller 21 that performs both the capacity restoring process of causing the positive electrode 13 and the positive electrode capacity restoring electrode 18 to energize each other, and the capacity restoring process of causing the negative electrode 14 and the negative electrode capacity restoring electrode 17 to energize each other. Accordingly, as described above, the controller 21 performs the capacity restoring process of the positive electrode 13 and the capacity restoring process of the negative electrode 14. This makes it possible to restore the battery capacity of the secondary battery including the two aqueous electrolytic solutions (i.e., the positive electrode electrolytic solution 15 and the negative electrode electrolytic solution 16).

Other action and effects related to the secondary battery control system are similar to the other action and effects related to the secondary battery described herein according to an embodiment.

The respective configurations of the secondary battery and the secondary battery control system described above are appropriately modifiable including as described below according to an embodiment. Note that any two or more of the following series of modifications may be combined with each other.

Figure 3:
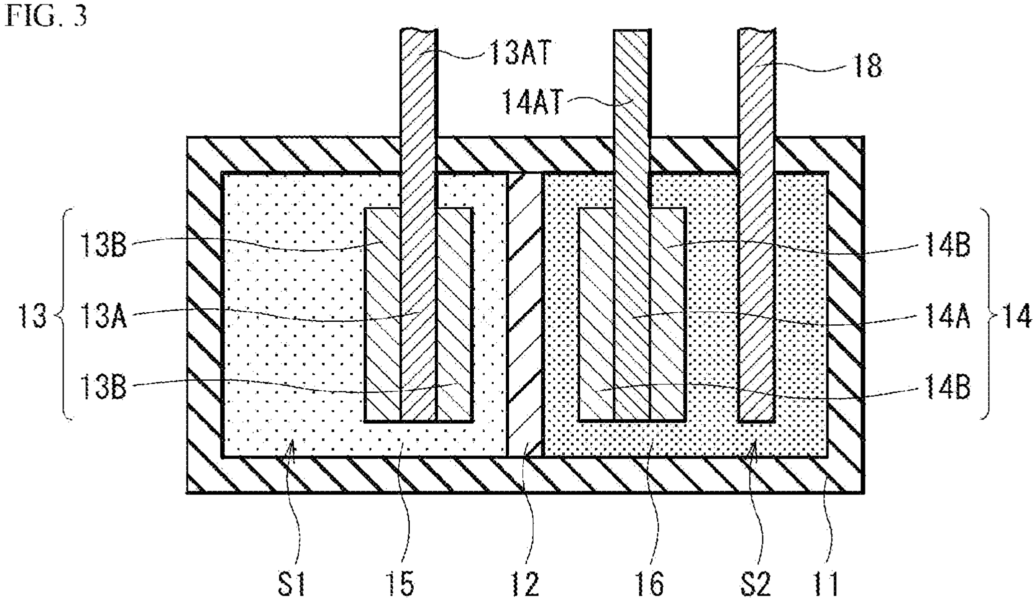
FIG. 3 is a sectional view of a configuration of a secondary battery according to an embodiment.
Figure 4:
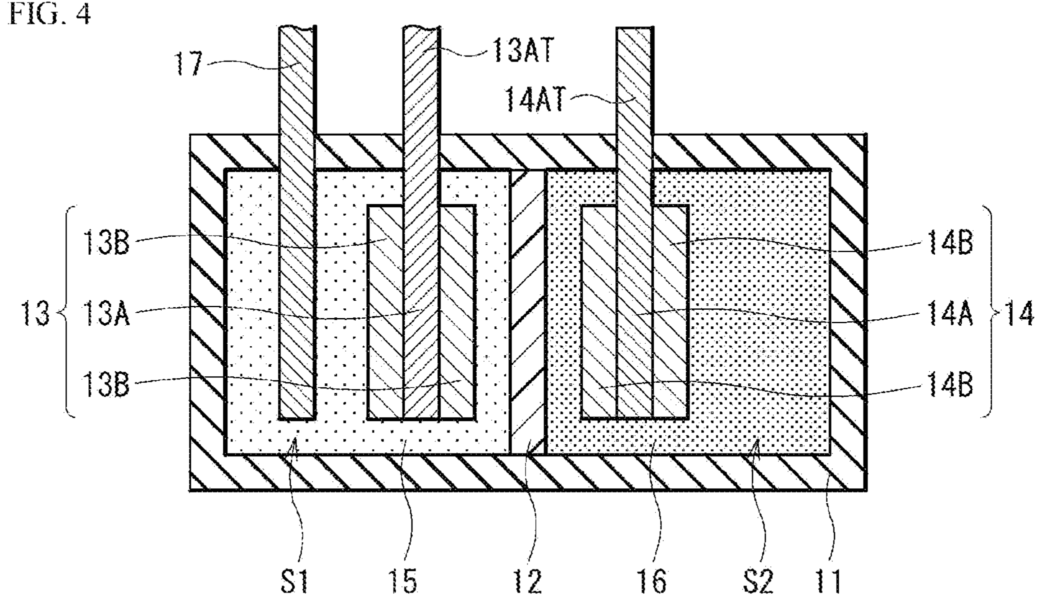
FIG. 4 is a sectional view of a configuration of a secondary battery according to an embodiment.

In FIG. 1, the secondary battery includes both the negative electrode capacity restoring electrode 17 and the positive electrode capacity restoring electrode 18. However, as illustrated in FIG. 3 corresponding to FIG. 1, the secondary battery may not include the negative electrode capacity restoring electrode 17 and may include only the positive electrode capacity restoring electrode 18, or as illustrated in FIG. 4 corresponding to FIG. 1, the secondary battery may not include the positive electrode capacity restoring electrode 18 and may include only the negative electrode capacity restoring electrode 17.

In these cases also, as described above, the capacity restoring process of the positive electrode 13 is performed using the positive electrode capacity restoring electrode 18, and the capacity restoring process of the negative electrode 14 is performed using the negative electrode capacity restoring electrode 17. Accordingly, effects similar to those of the case illustrated in FIG. 1 are obtainable.

Figure 5:
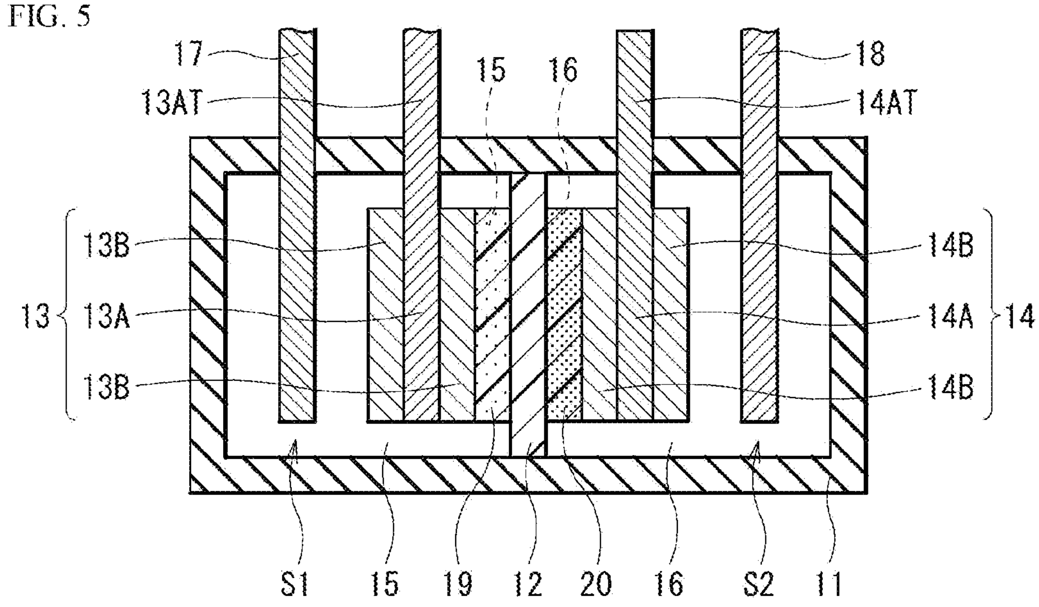
FIG. 5 is a sectional view of a configuration of a secondary battery according to an embodiment.

In FIG. 1, the secondary battery includes the two aqueous electrolytic solutions which are liquid electrolytes, i.e., the positive electrode electrolytic solution 15 and the negative electrode electrolytic solution 16. However, as illustrated in FIG. 5 corresponding to FIG. 1, a secondary battery may include two aqueous electrolyte layers which are gel electrolytes, i.e., a positive electrode electrolyte layer 19 and a negative electrode electrolyte layer 20, instead of the two aqueous electrolytic solutions. A configuration of the secondary battery illustrated in FIG. 5 is similar to the configuration of the secondary battery illustrated in FIG. 1 except for those described below.

The positive electrode electrolyte layer 19 is interposed between the positive electrode 13 and the partition 12, and the negative electrode electrolyte layer 20 is interposed between the negative electrode 14 and the partition 12. In other words, the positive electrode electrolyte layer 19 is adjacent to each of the positive electrode 13 and the partition 12, and the negative electrode electrolyte layer 20 is adjacent to each of the negative electrode 14 and the partition 12.

Specifically, the positive electrode electrolyte layer 19 includes the positive electrode electrolytic solution 15 and a polymer compound, and the positive electrode electrolytic solution 15 is held by the polymer compound. The negative electrode electrolyte layer 20 includes the negative electrode electrolytic solution 16 and a polymer compound, and the negative electrode electrolytic solution 16 is held by the polymer compound. The polymer compound is not limited to a particular kind, and specifically includes one or more of materials including, without limitation, polyvinylidene difluoride and polyethylene oxide. In FIG. 5, the positive electrode electrolyte layer 19 including the positive electrode electrolytic solution 15 is lightly shaded and the negative electrode electrolyte layer 20 including the negative electrode electrolytic solution 16 is darkly shaded.

In a case of forming the positive electrode electrolyte layer 19, the positive electrode electrolytic solution 15, the polymer compound, and a solvent are mixed with each other to thereby prepare a precursor solution in a sol form, following which the precursor solution is applied on the surface of the positive electrode 13. In a case of forming the negative electrode electrolyte layer 20, the negative electrode electrolytic solution 16, the polymer compound, and a solvent are mixed with each other to thereby prepare a precursor solution in a sol form, following which the precursor solution is applied on the surface of the negative electrode 14. However, the precursor solution may be applied on a surface of the partition 12 to thereby form the positive electrode electrolyte layer 19, and the precursor solution may be applied on another surface of the partition 12 to thereby form the negative electrode electrolyte layer 20.

In this case also, the lithium ion is movable between the positive electrode 13 and the negative electrode 14 via the positive electrode electrolyte layer 19 and the negative electrode electrolyte layer 20. Accordingly, it is possible to achieve effects similar to those of the case illustrated in FIG. 1. Note that the positive electrode electrolytic solution 15 may be used in combination with the negative electrode electrolyte layer 20, and the positive electrode electrolyte layer 19 may be used in combination with the negative electrode electrolytic solution 16.

In FIG. 1, the inside of the positive electrode compartment S1 is filled with the positive electrode electrolytic solution 15, and thus has no excess space S1Z, and the inside of the negative electrode compartment S2 is filled with the negative electrode electrolytic solution 16, and thus has no excess space S2Z. The excess space S1Z is a space, of the inside of the positive electrode compartment S2, in which no positive electrode electrolytic solution 15 is present, and the excess space S2Z is a space, of the inside of the negative electrode compartment S2, in which no negative electrode electrolytic solution 16 is present.

Figure 6:
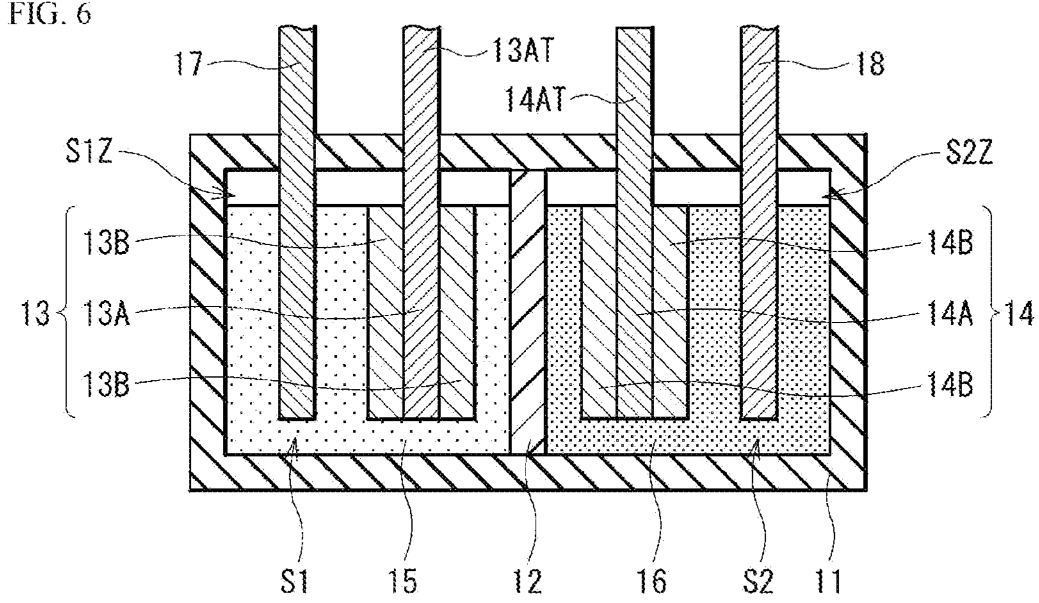
FIG. 6 is a sectional view of a configuration of a secondary battery according to an embodiment.

However, as illustrated in FIG. 6 corresponding to FIG. 1, the excess space S1Z may be present inside the positive electrode compartment S1 due to a decrease in an contained amount of the positive electrode electrolytic solution 15 caused by some factor, and the excess space S2Z may be present inside the negative electrode compartment S2 due to a decrease in an contained amount of the negative electrode electrolytic solution 16 caused by some factor. Factors that decrease the contained amount of the positive electrode electrolytic solution 15 include, for example, volatilization and leakage of the positive electrode electrolytic solution 15, and factors that decrease the contained amount of the negative electrode electrolytic solution 16 include, for example, volatilization and leakage of the negative electrode electrolytic solution 16.

In this case, as a result of the decrease in the contained amount of the positive electrode electrolytic solution 15, a portion of the positive electrode active material layer 13B of the positive electrode 13 may be exposed, or no portion of the positive electrode active material layer 13B thereof may be exposed. Further, as a result of the decrease in the contained amount of the negative electrode electrolytic solution 16, a portion of the negative electrode active material layer 14B of the negative electrode 14 may be exposed, or no portion of the negative electrode active material layer 14B thereof may be exposed.

A position of a liquid level (an upper surface) of the positive electrode electrolytic solution 15 is not particularly limited, and may thus be set as desired within a range in which the positive electrode electrolytic solution 15 is able to be in contact with the positive electrode active material layer 13B. Further, a position of a liquid level (an upper surface) of the negative electrode electrolytic solution 16 is not particularly limited, and may thus be set as desired within a range in which the negative electrode electrolytic solution 16 is able to be in contact with the negative electrode active material layer 14B.

In this case also, as described above, the capacity restoring process of the positive electrode 13 is performed using the positive electrode capacity restoring electrode 18, and the capacity restoring process of the negative electrode 14 is performed using the negative electrode capacity restoring electrode 17. Accordingly, effects similar to those of the case illustrated in FIG. 1 are obtainable.

In this case, in particular, the negative electrode capacity restoring electrode 17 including the oxygen-reducing material is used to reduce not only oxygen dissolved in the positive electrode electrolytic solution 15, but also oxygen present in the excess space S1Z. Accordingly, an amount of oxygen consumed increases, and it is thus possible to achieve higher effects.

Further, the positive electrode capacity restoring electrode 18 including the hydrogen-oxidizing material is used to oxidize not only hydrogen dissolved in the negative electrode electrolytic solution 16, but also hydrogen present in the excess space S2Z. Accordingly, an amount of hydrogen consumed increases, and it is thus possible to achieve higher effects.

Although not specifically illustrated, Modification 4 described here may be applied not only to FIG. 1, but also to FIG. 3 and FIG. 4. In these cases also, effects similar to those of the case illustrated in FIG. 6 are obtainable. Needless to say: the excess space S2Z may be absent inside the negative electrode compartment S2, whereas the excess space S1Z is present inside the positive electrode compartment S1; or the excess space S1Z may be absent inside the positive electrode compartment S1, whereas the excess space S2Z is present inside the negative electrode compartment S2.

In Modification 4 (FIG. 6) described above: a portion of the negative electrode capacity restoring electrode 17 is immersed in the positive electrode electrolytic solution 15, and thus, the negative electrode capacity restoring electrode 17 is in contact with the positive electrode electrolytic solution 15; and a portion of the positive electrode capacity restoring electrode 18 is immersed in the negative electrode electrolytic solution 16, and thus, the positive electrode capacity restoring electrode 18 is in contact with the negative electrode electrolytic solution 16.

Figures 7, 8:
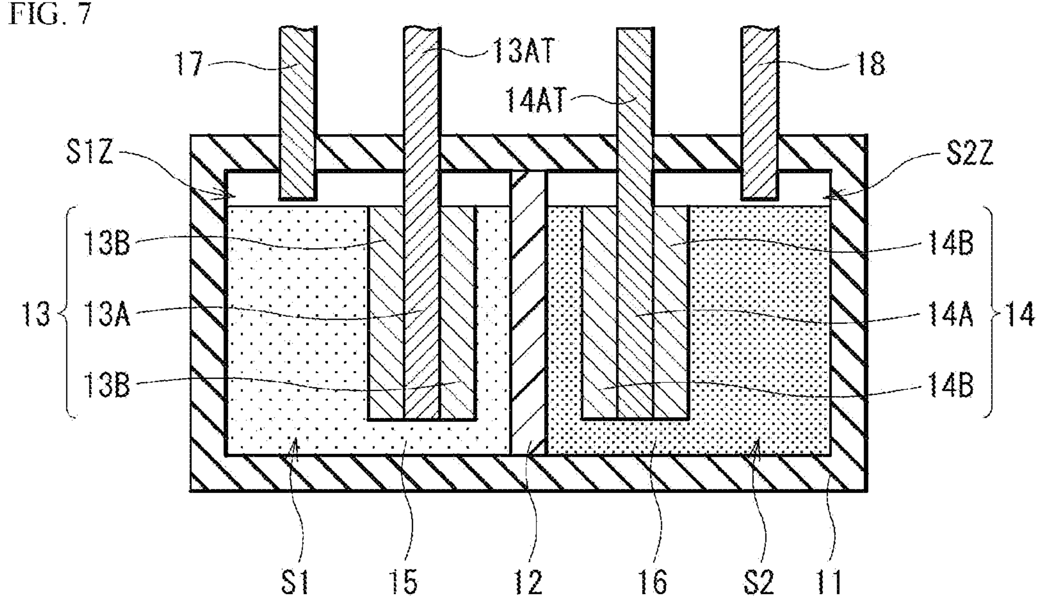
FIG. 7 is a sectional view of a configuration of a secondary battery according to an embodiment.
FIG. 8 is a block diagram illustrating a configuration of an application example of the secondary battery, which is a battery pack according to an embodiment.

However, as illustrated in FIG. 7 corresponding to FIG. 6: no portion of the negative electrode capacity restoring electrode 17 may be immersed in the positive electrode electrolytic solution 15 and terminate in the excess space S1Z, and thus, the negative electrode capacity restoring electrode 17 may not be in contact with the positive electrode electrolytic solution 15; and no portion of the positive electrode capacity restoring electrode 18 may be immersed in the negative electrode electrolytic solution 16 and terminate in the excess space S2Z, and thus, the positive electrode capacity restoring electrode 18 may not be in contact with the negative electrode electrolytic solution 16.

In this case also, as described above, the capacity restoring process of the positive electrode 13 is performed using the positive electrode capacity restoring electrode 18, and the capacity restoring process of the negative electrode 14 is performed using the negative electrode capacity restoring electrode 17. Accordingly, effects similar to those of the case illustrated in FIG. 6 are obtainable.

A portion of the positive electrode capacity restoring electrode 18 can be immersed in the negative electrode electrolytic solution 16, and thus, the positive electrode capacity restoring electrode 18 is in contact with the negative electrode electrolytic solution 16; whereas no portion of the negative electrode capacity restoring electrode 17 is immersed in the positive electrode electrolytic solution 15, and thus, the negative electrode capacity restoring electrode 17 is not in contact with the positive electrode electrolytic solution 15 according to an embodiment. Further, no portion of the positive electrode capacity restoring electrode 18 is immersed in the negative electrode electrolytic solution 16, and thus, the positive electrode capacity restoring electrode 18 is not in contact with the negative electrode electrolytic solution 16; whereas a portion of the negative electrode capacity restoring electrode 17 is immersed in the positive electrode electrolytic solution 15, and thus, the negative electrode capacity restoring electrode 17 is in contact with the positive electrode electrolytic solution 15 according to an embodiment.

In the secondary battery control system illustrated in FIG. 2, the controller 21 performs both the capacity restoring process of causing the positive electrode 13 and the positive electrode capacity restoring electrode 18 to energize each other, and the capacity restoring process of causing the negative electrode 14 and the negative electrode capacity restoring electrode 17 to energize each other. However, the controller 21 may perform only one of the capacity restoring process of causing the positive electrode 13 and the positive electrode capacity restoring electrode 18 to energize each other, or the capacity restoring process of causing the negative electrode 14 and the negative electrode capacity restoring electrode 17 to energize each other.

In this case also, the battery capacity is restored by using one of the negative electrode capacity restoring electrode 17 or the positive electrode capacity restoring electrode 18. Accordingly, similar effects are obtainable.

Applications (application examples) of the secondary battery are not particularly limited. The secondary battery used as a power source may serve as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery pack may include a single battery (one secondary battery), or may include an assembled battery (multiple secondary batteries). The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. FIG. 8 illustrates a block configuration of a battery pack. The battery pack described here is a simplified battery pack (a so-called soft pack) including one secondary battery, and is to be mounted on, for example, electronic equipment typified by a smartphone.

As illustrated in FIG. 8, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The configuration of the secondary battery is as described above. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive (PTC) device 58, and a temperature detector 59. However, the PTC device 58 may be omitted.

The controller 56 has a configuration similar to the configuration of the secondary battery control system described above, and controls an overall operation of the battery pack. The controller 56 detects and controls a use state of the electric power source 51 on an as-needed basis.

If a voltage of the electric power source 51 (the secondary battery) reaches an overcharge detection voltage, the controller 56 turns off the switch 57. This prevents a charging current from flowing into a current path of the electric power source 51.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected based on an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

Needless to say, the secondary battery may have applications other than the series of applications described here as examples.

EXAMPLES

Examples of the present technology are described below according to an embodiment.

Examples 1 and 2 and Comparative Example 1

As described below, secondary batteries using the lithium ion which is the alkali metal ion were fabricated, following which the secondary batteries were each evaluated for a battery characteristic.

Fabrication of Secondary Batteries of Examples 1 and 2

The secondary batteries each including the positive electrode capacity restoring electrode 18 illustrated in FIG. 3 were fabricated in accordance with the following procedure.

(Fabrication of Positive Electrode)

First, 91 parts by mass of the positive electrode active material ($LiMn_2O_4$ which is the lithium composite oxide having the spinel crystal structure), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into the solvent (N-methyl-2-pyrrolidone which is the organic solvent), following which the organic solvent was stirred to thereby prepare a paste positive electrode mixture slurry. Lastly, the positive electrode mixture slurry was applied on the two opposed surfaces of the positive electrode current collector 13A (a titanium foil having a thickness of 10 μm) excluding the coupling terminal part 13AT by means of a coating apparatus, following which the applied positive electrode mixture slurry was dried to thereby form the positive electrode active material layers 13B. Thus, the positive electrode 13 was fabricated.

(Fabrication of Negative Electrode)

First, 89 parts by mass of the negative electrode active material ($TiO_2$ which is titanium oxide of the anatase type), 10 parts by mass of the negative electrode binder (polyvinylidene difluoride), and 1 part by mass of the negative electrode conductor (graphite) were mixed with each other to thereby obtain a negative electrode mixture. Thereafter, the negative electrode mixture was put into the solvent (N-methyl-2-pyrrolidone which is the organic solvent), following which the organic solvent was stirred to thereby prepare a paste negative electrode mixture slurry. Lastly, the negative electrode mixture slurry was applied on the two opposed surfaces of the negative electrode current collector 14A (a titanium foil having a thickness of 10 μm) excluding the coupling terminal part 14AT by means of a coating apparatus, following which the applied negative electrode mixture slurry was dried to thereby form the negative electrode active material layers 14B. Thus, the negative electrode 14 was fabricated.

(Preparation of Positive Electrode Electrolytic Solution)

The ionic material (lithium sulfate ($Li_2SO_4$)) was put into the aqueous solvent (pure water), following which the aqueous solvent was stirred. The ionic material was thereby dispersed or dissolved in the aqueous solvent. As a result, the positive electrode electrolytic solution 15 which is the aqueous electrolytic solution was prepared. In this case, the concentration was set to 3 mol/kg and the pH was set to 5.

(Preparation of Negative Electrode Electrolytic Solution)

The ionic material (lithium hydroxide (LiOH)) was put into the aqueous solvent (pure water), following which the aqueous solvent was stirred. The ionic material was thereby dispersed or dissolved in the aqueous solvent. As a result, the negative electrode electrolytic solution 16 which is the aqueous electrolytic solution was prepared. In this case, the concentration was set to 4 mol/kg and the pH was set to 12. That is, the pH of the negative electrode electrolytic solution 16 was set to be higher than the pH of the positive electrode electrolytic solution 15.

(Assembly of Secondary Battery)

First, the outer package member 11 (the positive electrode compartment S1 and the negative electrode compartment S2) to which the partition 12 was attached to the inside thereof was prepared. The outer package member 11 was a glass container. The partition 12 was a cation exchange membrane, Nafion115 (registered trademark), available from Sigma-Aldrich Japan.

Thereafter, the positive electrode 13 was placed into the positive electrode compartment S1, and the negative electrode 14 and the positive electrode capacity restoring electrode 18 were placed into the negative electrode compartment S2. Materials included in the positive electrode capacity restoring electrode 18 were as listed in Table 1. Here, as the materials (the component materials) of the positive electrode capacity restoring electrode 18, nickel (Ni) which is the oxygen-generating material and platinum (Pt) which is the oxygen-generating and hydrogen-oxidizing material were used. In this case, the coupling terminal parts 13AT and 14AT were each led out of the outer package member 11, and a portion of the positive electrode capacity restoring electrode 18 was led out of the outer package member 11.

Lastly, the positive electrode electrolytic solution 15 was supplied into the positive electrode compartment S1, and the negative electrode electrolytic solution 16 was supplied into the negative electrode compartment S2. Thus, the positive electrode electrolytic solution 15 was contained in the positive electrode compartment S1 in which the positive electrode 13 was disposed, and the negative electrode electrolytic solution 16 was contained in the negative electrode compartment S2 in which the negative electrode 14 and the positive electrode capacity restoring electrode 18 were disposed. As a result, the secondary battery including the two aqueous electrolytic solutions (i.e., the positive electrode electrolytic solution 15 and the negative electrode electrolytic solution 16) was completed.

Fabrication of Secondary Battery of Comparative Example 1

With a similar procedure except that the positive electrode capacity restoring electrode 18 was not used, the secondary batteries each including no positive electrode capacity restoring electrode 18 were fabricated. Whether the positive electrode capacity restoring electrode 18 was present or absent was as listed in Table 1.

[Evaluation of Battery Characteristic]

The secondary batteries were each evaluated for a capacity restoring characteristic as a battery characteristic. The evaluation results are presented in Table 1.

Evaluation of Capacity Restoring Characteristic Using Secondary Batteries of Examples 1 and 2

First, the secondary battery in which the positive electrode 13 and the negative electrode 14 were coupled to each other was used, and the secondary battery was charged and discharged in an ambient temperature environment (at a temperature of 25° C.) to thereby measure a discharge capacity (a first-cycle discharge capacity).

Thereafter, the secondary battery in which the positive electrode 13 and the negative electrode 14 were coupled to each other was used, and the secondary battery was repeatedly charged and discharged in the same environment until the number of cycles (the number of times of charging and discharging) reached 50 to thereby measure the discharge capacity (a 50th-cycle discharge capacity).

Upon charging, the secondary battery was charged with a constant current of 2 C until a battery voltage reached 2.0 V, and upon discharging, the secondary battery was discharged with a constant current of 2 C until the battery voltage reached 1.5 V. Note that 2 C is a value of a current that causes a battery capacity (a theoretical capacity) to be completely discharged in 0.5 hours.

Thereafter, in the secondary battery, the coupling destination of the positive electrode 13 was switched from the negative electrode 14 to the positive electrode capacity restoring electrode 18, following which the positive electrode 13 and the positive electrode capacity restoring electrode 18 were coupled to each other. With use of such a secondary battery, the capacity restoring process of the secondary battery (the positive electrode 13) was performed. In this case, the positive electrode 13 and the positive electrode capacity restoring electrode 18 were caused to energize each other in the same environment to thereby discharge the positive electrode 13. Upon discharging, the secondary battery was discharged with a current of 0.05 C until a potential difference (a difference between the potential of the positive electrode 13 and the potential of the positive electrode capacity restoring electrode 18) reached 0 V. Note that 0.05 C is a value of a current that causes the battery capacity to be completely discharged in 20 hours.

Thereafter, in the secondary battery, the coupling destination of the positive electrode 13 was switched from the positive electrode capacity restoring electrode 18 to the negative electrode 14, following which the positive electrode 13 and the negative electrode 14 were coupled to each other again. With use of such a secondary battery, charging and discharging of the secondary battery was performed in the same environment to thereby measure the discharge capacity (a 51st-cycle discharge capacity).

Lastly, a capacity restoring rate which is an index for evaluating the capacity restoring characteristic was calculated based on the following calculation expression: capacity restoring rate (%)=[(51st-cycle discharge capacity−50th-cycle discharge capacity)/first-cycle discharge capacity)]×100.

Evaluation of Capacity Restoring Characteristic Using Secondary Battery of Comparative Example 1

The capacity restoring rate was calculated by a similar procedure except that the capacity restoring process of the secondary battery (the positive electrode 13) was not performed because the secondary battery did not include the positive electrode capacity restoring electrode 18.

TABLE 1

| | Positive electrode capacity restoring electrode | | Capacity restoring | Capacity restoring |
|---|---|---|---|---|
| | Present/Absent | Material | process | rate (%) |
| Example 1 | Present | Ni | Performed | 20 |
| Example 2 | Present | Pt | Performed | 13 |
| Comparative example 1 | Absent | — | Not performed | 0 |

As indicated in Table 1, the capacity restoring rate varied depending on the configuration (presence or absence of the positive electrode capacity restoring electrode 18) of the secondary battery, that is, whether the capacity restoring process was performed.

Specifically, in a case where the secondary battery did not include the positive electrode capacity restoring electrode 18 and therefore the capacity restoring process of the positive electrode 13 was not performed (Comparative example 1), the capacity restoring rate was 0%. Thus, the battery capacity was not restored. In contrast, in a case where the secondary battery included the positive electrode capacity restoring electrode 18 and therefore the capacity restoring process of the positive electrode 13 was performed (Examples 1 and 2), the capacity restoring rates were 13% and 20%. Thus, the battery capacity was restored.

Based upon the results presented in Table 1, the capacity restoring rate increased in a case where: the secondary battery including the positive electrode 13, the negative electrode 14, and the two aqueous electrolytic solutions (the positive electrode electrolytic solution 15 and the negative electrode electrolytic solution 16) included the positive electrode capacity restoring electrode 18; and the positive electrode 13 and the positive electrode capacity restoring electrode 18 were caused to energize each other. It was therefore possible to restore the battery capacity of the secondary battery.

Note that, although not specifically verified here, the capacity restoring rate increases also in a case where: the secondary battery including the positive electrode 13, the negative electrode 14, and the two aqueous electrolytic solutions (the positive electrode electrolytic solution 15 and the negative electrode electrolytic solution 16) includes the negative electrode capacity restoring electrode 17; and the negative electrode 14 and the negative electrode capacity restoring electrode 17 are caused to energize each other. It is therefore possible to restore the battery capacity of the secondary battery.

Although the configuration of the secondary battery of the present technology has been described herein including with reference to one or more embodiments including Examples, the configuration of the secondary battery of the present technology is not limited thereto, and is therefore modifiable in a variety of suitable ways.

The effects described herein are mere examples, and effects of the present technology are therefore not limited to those described herein. Accordingly, the present technology may achieve any other suitable effect.

The invention claimed is:

1. A secondary battery comprising:

a partition that is disposed between a positive electrode space and a negative electrode space, and allows an alkali metal ion to pass therethrough;

a positive electrode that is disposed in the positive electrode space and which the alkali metal ion is to be inserted into and extracted from;

a negative electrode that is disposed in the negative electrode space and which the alkali metal ion is to be inserted into and extracted from;

a positive electrode electrolytic solution that is contained in the positive electrode space and includes an aqueous solvent and the alkali metal ion;

a negative electrode electrolytic solution that is contained in the negative electrode space and includes an aqueous solvent and the alkali metal ion; and a negative electrode capacity restoring electrode, a positive electrode capacity restoring electrode, or both, the negative electrode capacity restoring electrode being disposed in the positive electrode space, the positive electrode capacity restoring electrode being disposed in the negative electrode space, wherein the negative electrode capacity restoring electrode includes a hydrogen-generating material, an oxygen-reducing material, or both, and the positive electrode capacity restoring electrode includes an oxygen-generating material, a hydrogen-oxidizing material, or both.

2. The secondary battery according to claim 1, wherein the hydrogen-generating material includes at least one of platinum, iridium, nickel, iron, or palladium as at least one constituent element, the oxygen-reducing material includes at least one of platinum, a platinum-ruthenium alloy, porous carbon, niobium oxide, tin oxide, or titanium oxide, the oxygen-generating material includes at least one of nickel, manganese, iridium, palladium, tantalum, or platinum as at least one constituent element, and the hydrogen-oxidizing material includes at least one of platinum, silver, silver oxide, zirconium oxide, or a nickel-chromium alloy.

3. The secondary battery according to claim 1, wherein the positive electrode includes a positive electrode active material which the alkali metal ion is to be inserted into and extracted from at a potential, versus a standard hydrogen reference electrode, of higher than or equal to 0.4 volts, and the negative electrode includes a negative electrode active material which the alkali metal ion is to be inserted into and extracted from at a potential, versus the standard hydrogen reference electrode, of lower than or equal to 0 volts.

4. The secondary battery according to claim 1, wherein a pH of the negative electrode electrolytic solution is higher than a pH of the positive electrode electrolytic solution.

5. The secondary battery according to claim 4, wherein the pH of the positive electrode electrolytic solution is higher than or equal to 3 and lower than or equal to 8, and the pH of the negative electrode electrolytic solution is higher than or equal to 11.

6. A secondary battery control system comprising a control circuit to be coupled to the secondary battery according to claim 1, wherein the control circuit performs a process including switching a coupling destination of the positive electrode from the negative electrode to the positive electrode capacity restoring electrode and causing the positive electrode and the positive electrode capacity restoring electrode to energize each other, a process including switching a coupling destination of the negative electrode from the positive electrode to the negative electrode capacity restoring electrode and causing the negative electrode and the negative electrode capacity restoring electrode to energize each other, or both the processes.

7. A battery pack comprising:

the secondary battery control system according to claim 6.

* * * * *